United States Patent [19]

Kutsuwada et al.

[11] Patent Number: 5,862,437
[45] Date of Patent: *Jan. 19, 1999

[54] POWER SUPPLY CONTROLLER FOR USE IN AN IMAGE FORMATION APPARATUS AND METHOD

[75] Inventors: Satoru Kutsuwada, Yokohama; Izuru Horiuchi, Toride, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 727,224

[22] Filed: Oct. 8, 1996

[30] Foreign Application Priority Data

Oct. 12, 1995 [JP] Japan .................................. 7-264232

[51] Int. Cl.$^6$ .................................................. G03G 15/00
[52] U.S. Cl. .................................. 399/88; 399/37; 399/97
[58] Field of Search ................................. 399/37, 44, 88, 399/97

[56] References Cited

U.S. PATENT DOCUMENTS

| | | | |
|---|---|---|---|
| 4,113,375 | 9/1978 | Murata et al. | 399/88 |
| 4,989,039 | 1/1991 | Hayashi et al. | 399/44 |
| 5,420,667 | 5/1995 | Kaneko et al. | 399/37 X |
| 5,457,516 | 10/1995 | Kim | 399/37 |
| 5,670,832 | 9/1997 | Takeda | 399/37 X |

FOREIGN PATENT DOCUMENTS

| | | |
|---|---|---|
| 7-186492 | 7/1995 | Japan . |
| 8-242322 | 9/1996 | Japan . |
| 8-251317 | 9/1996 | Japan . |

Primary Examiner—Fred L. Braun
Attorney, Agent, or Firm—Fitzpatrick, Cella, Harper & Scinto

[57] ABSTRACT

A power supply controller for use in an image formation apparatus includes a first control circuit for controlling the image formation apparatus to form an image, a second control circuit for controlling electric power supplied to the image formation apparatus, a first power supply for supplying electric power to the first control circuit, a second power supply for supplying electric power to the second control circuit, and a third power supply for supplying electric power to a load in the image formation apparatus. The apparatus further includes a dew protection switch operable in an on-state and an off-state. The on-state sets an operation mode of the image formation apparatus to prevent dew condensation inside the image formation apparatus. Finally, the apparatus includes a low power consumption mode setting device for setting a low power consumption mode of the image forming apparatus. When the low power consumption mode is set and the dew protection switch is in the on-state, the second control circuit turns off the third power supply and maintains operation of the first and second power supplies. When the dew protection switch is in the off-state, the second control circuit turns off the first and third power supplies and maintains operation of the second power supply.

17 Claims, 15 Drawing Sheets

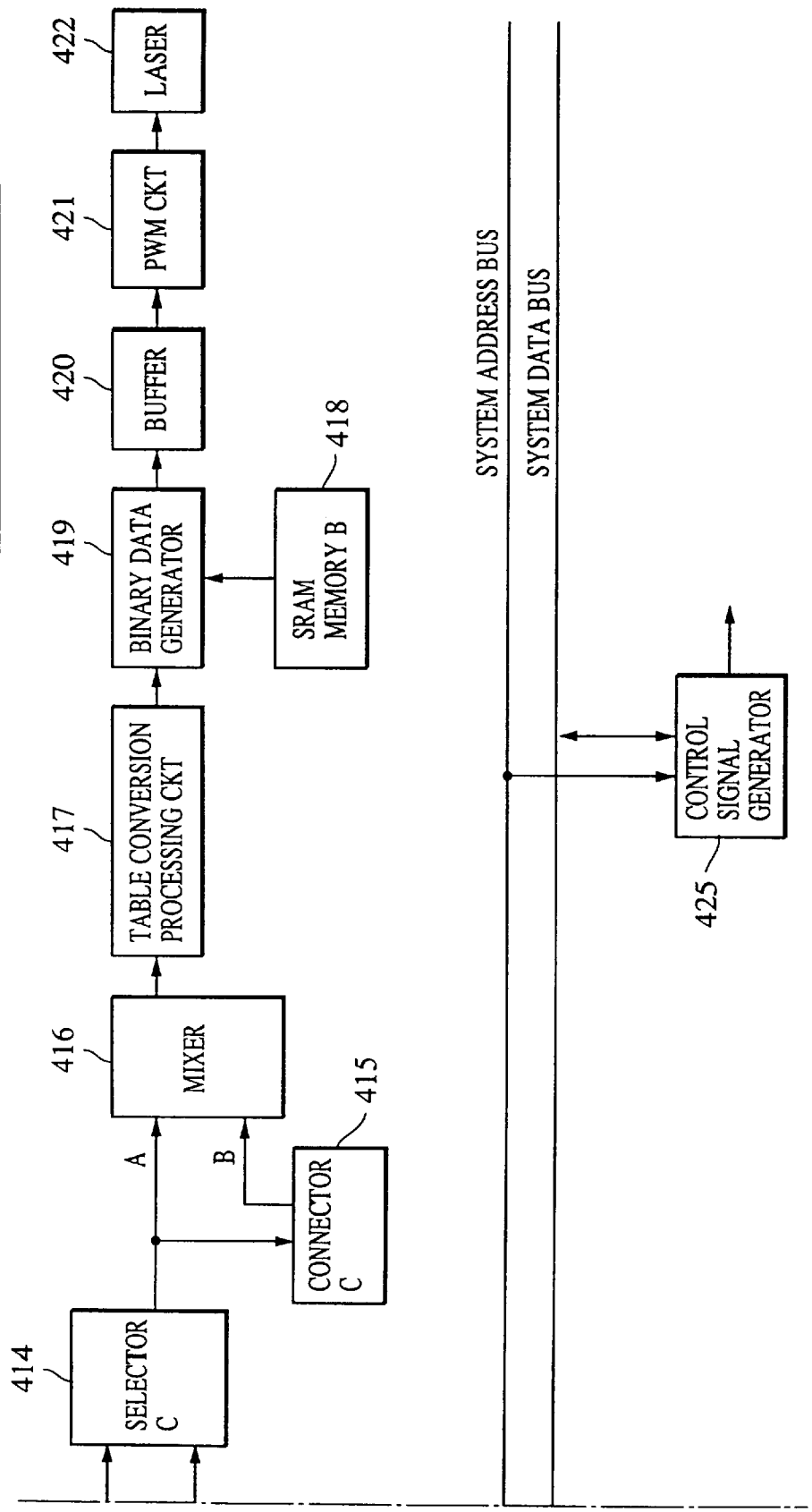

POWER SUPPLY CONTROLLER FOR USE IN AN IMAGE FORMATION APPARATUS AND METHOD

BACKGROUND OF THE INVENTION

1. Field of the Invention

The present invention relates to a power supply controller to achieve a reduction in power consumption of an image formation apparatus such as a copy machine.

2. Description of the Related Art

In recent years, a touch panel with a liquid crystal display has come to be widely used in a digital multifunction apparatus having a plurality of capabilities such as copying or facsimile communication capability. In general, the liquid crystal display has a short life compared with other components. It is desirable therefore that the liquid crystal be turned off when not in use.

The digital multifunction apparatus is generally maintained in a power-on state even during night so that it can receive a facsimile call which may come at night. Furthermore, the apparatus is often not used for a long time.

To avoid the above problem, the apparatus has a sleep mode so that if no operation has been performed for a predetermined time period, the apparatus goes into a sleep mode in which the liquid crystal display is turned off and no information is displayed thereon.

Some apparatus have the automatic shut-off capability so that when the apparatus has not been operated for a predetermined time period the electric power of the apparatus is turned off. However, the above-mentioned sleep mode cannot provide a sufficient reduction in power consumption. The automatic shut-off technique in which the electric power is turned off cannot be directly employed in a multifunction apparatus having the facsimile capability which require continuous electric power.

Furthermore, when the electric power is turned off dew condensation can occur inside the apparatus depending on the ambient temperature.

SUMMARY OF THE INVENTION

Accordingly, it is a purpose of the present invention to provide a power control method and a power supply controller for use in an image processing apparatus which no longer has the above problems.

It is another object of the present invention to provide a power control method and a power supply controller for use in an image processing apparatus, which achieves a great reduction in power consumption of an apparatus. It is still another object of the present invention to provide a power control method and a power supply controller for use in an image formation apparatus, which can prevent dew condensation inside the apparatus while maintaining the capability of reducing the power consumption of the apparatus. Additional objects and features of the invention will be more readily apparent from the following detailed description and appended claims when taken in conjunction with the drawings.

DESCRIPTION OF THE PREFERRED EMBODIMENTS

Figure 1:
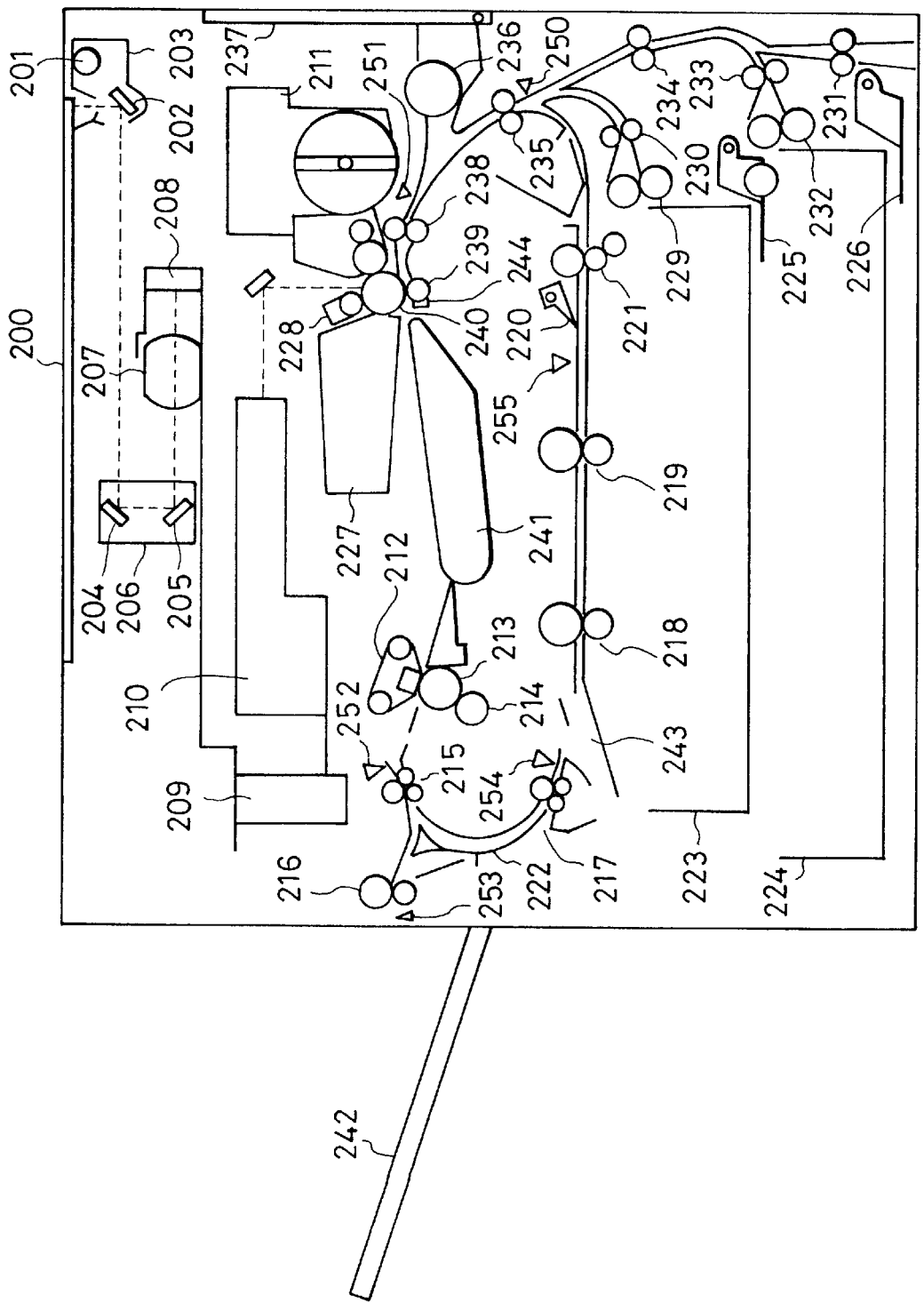
FIG. 1 is a schematic diagram of a digital copy machine according to the present invention.

With reference to preferred embodiments, the present invention will be described in greater detail below in conjunction with the accompanying drawings. FIG. 1 illustrates the construction of a digital copy machine according to the present invention.

An exposure lamp 201 such as a fluorescent lamp or a halogen lamp illuminates a document placed on a document glass plate (document plate) 200 while moving in a direction perpendicular to the longitudinal direction of the exposure lamp 201. The light from the exposure lamp 201 is scattered by the document and reflected by first, second and third mirrors 202, 204, 205, and then is directed to a lens 207. In the above illumination, a second movable unit 206 including the second mirror 204 and the third mirror 205 moves at a speed half that of a first movable unit 203 including the exposure lamp 201 and the first mirror 202 so that the distance from the illuminated document plane to the lens 207 is maintained constant. The image of the document is formed, via the mirrors 202, 204, 205 and the lens 207, on the photosensing plane of a CCD line sensor 208 including about 5,000 photosensor elements arranged in a line and thus the optical image signal is converted to an electrical signal line by line by the CCD line sensor 208. The resultant electric signal is processed by a signal processing unit (not shown) into a PWM (pulse-width modulated) signal.

In response to the PWM image signal output from the signal processing unit, an exposure controller 210 drives a semiconductor laser so that a light beam illuminates the surface of a photoconductive drum 240 rotating at a constant speed. The light beam is deflected by a polygon mirror so that the photoconductive drum 240 is scanned by the light beam along the axial direction of the photoconductive drum 240. The exposure controller 210 is cooled by a cooling fan 209.

Before illuminating the photoconductive drum 240 by the above light beam, the charge remaining on the drum is removed by illuminating the photoconductive drum 240 by a pre-exposure lamp (not shown) and then the surface of the photoconductive drum 240 is uniformly charged by a first charger 228. Thus, the photoconductive drum 240 receives the light beam during the rotation, and correspondingly an electrostatic latent image is formed on the surface of the photoconductive drum 240. A developing unit 211 then develops the electrostatic latent image on the surface of the drum into a visual image with a tonor having a predetermined color.

There are also provided copying paper trays 223 and 224 on which copying paper with a standard size is stacked. Lifters 225 and 226 lift a sheet of copying paper placed on the copying paper tray 223 or 224 to a height corresponding to a pair of paper feeding rollers 229 or 232. The pairs of paper feeding rollers 229, 232 are driven by the same motor (not shown) wherein the rotation directions of the rollers are controlled so that copying paper is selectively fed from one of copying paper trays 223, 224. Torque is imposed on each pair of rollers 229 and 232 in a direction opposite to the paper feeding direction thereby preventing duplication of feeding copying paper. Copying paper is fed from the copying paper tray 223 or 224 to registration rollers 238 via paper feeding rollers 230, 233, 234, and 235. In this embodiment, additional third and fourth copying paper trays may be installed below the tray 224. A pair of paper feeding rollers 231 directs copying paper into the above paper feeding path from a copying paper tray additionally installed at a lower location. If desired, a hand feeding mode is selected via the control panel. In the hand feeding mode, a hand feed tray 237 is opened, a sheet of copying paper is fed by hand into the apparatus from the hand feed tray 237. The paper is then transferred to the registration rollers 238 via a paper feeding roller 236.

The registration rollers 238 control the timing of carrying the copying paper to the image transfer position so that the end of the copying paper correctly corresponds to the end of the image formed on the photoconductive drum 240. With an image transfer charger 239, the tonor image developed on the photoconductive drum 240 is transferred onto the copying paper supplied at the image transfer position. After completion of transferring the image onto the copying paper, the toner remaining on the photoconductive drum 240 is removed by a cleaner 227. Since the photoconductive drum 240 has a large curvature, it is rather easy to separate the copy paper from the photoconductive drum 240 after the image transfer. A voltage is applied to a discharging needle 244 to reduce the attractive force between the photoconductive drum 240 and the copying paper thereby making it further easier to separate the copying paper from the photoconductive drum 240.

After separation, the copying paper is sent to fixing units 212 and 213 via a conveyor belt 241 and the toner is fixed at the fixing units. The fixing unit 212 includes a ceramic heater, a film, and two rollers. The heat generated by the ceramic heater is efficiently transferred via the thin film. A cooling roller 214 removes the heat from a fixing roller 213. Paper feeding rollers 215 including a large roller and two small rollers correct the curl of the copying paper and feed it further from the fixing unit.

A directional flapper 222 switches the feeding direction of copying paper depending on the operation mode. In the mode in which an image is transferred onto one side of copying paper at a time (one side copying mode), the direction flapper 222 is set such that copying paper travels along a path from the paper feeding rollers 215 to the paper outlet. A pair of ejection rollers 216 ejects the copied paper onto a copied-paper tray 242.

On the other hand, in the both-side copying mode, after completion of developing, transferring, and fixing for one side of copying paper, the paper is ejected by the pair of ejection rollers 216. However, the ejection operation is stopped when the trailing end of the paper has reached near the pair of ejection rollers 216, and then the pair of ejection rollers 216 rotates in the reverse direction. At the same time, the directional flapper 222 is switched to the other direction so that the copying paper is carried from the paper outlet to paper feeding rollers 217 passing below the directional flapper 222. The paper feeding rollers 217 have a construction similar to the paper feeding rollers 215. The paper feeding rollers 217 correct the curl of the copying paper and feed it to an intermediate tray 243. From the intermediate tray 243, the copying paper is carried to the above-described image transfer position via paper feeding rollers 218, 219, 221, and 235. A toner image is transferred onto the back side of the copying paper and the resultant copying paper is ejected onto the copied-paper tray 242. In a multiple copying mode, on the other hand, the direction of the directional flapper 222 is selected so that the copying paper which has passed through the paper feeding rollers 215 passes at the right side, as seen in FIG. 1, of the directional flapper 222 toward the paper feeding rollers 217. The paper feeding rollers 217 carry the copying paper to the intermediate tray 243. After that, the copying paper is fed from the intermediate tray to the above-described image transfer position via the roller 218, 219, 221, and 235. A toner image is then transferred onto the same side of the copying paper as the side on which the previous image has been transferred. The paper is then ejected onto the copied-paper tray 242.

Figure 2:
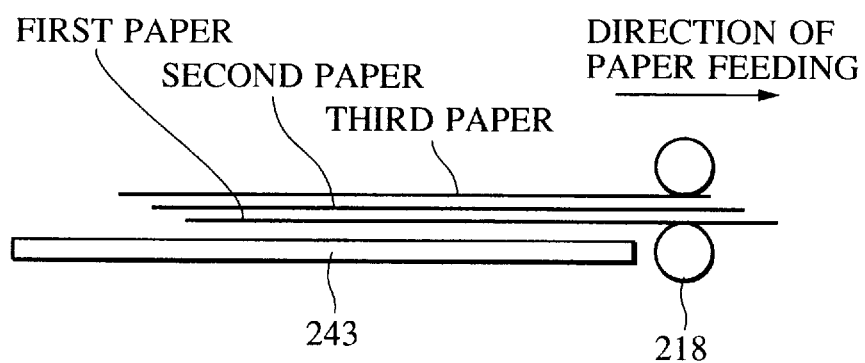
FIG. 2 is a schematic diagram illustrating copying paper on an intermediate tray.

In the case where the same image is formed on plural sheets of paper in the both-side copying mode or the multiple copying mode, a first sheet of copying paper is placed on the intermediate tray 243 with a part of the paper being held by the paper feeding rollers 218 at rest. If a second sheet of copying paper arrives at the paper feeding rollers 218, the paper feeding rollers 218 start to rotate so that the second sheet of copying paper as well as the first one is put between the rollers 218. The two sheets of copying paper are thus placed on the intermediate tray 243 with parts of the paper being held by the paper feeding rollers 218 at rest. A third and subsequent sheets of copying paper are placed on the intermediate tray 243 in a similar manner. In the above operation, copying paper which arrives later is placed on the copying paper which has arrived earlier such that the end of the later copying paper is located at a position apart in the direction opposite to the paper feeding direction from the end of the earlier copying paper as shown in FIG. 2.

When the number of sheets desired by an operator have been put on the intermediate tray 243, operation of feeding the sheets of paper from the intermediate tray 243 starts. In the course of the trip to the paper feeding rollers 221 via the paper feeding rollers 218 and 219, a separation lever 220 moves downward at a position between the end of first copying paper and the end of the second copying paper. As a result, although the first sheet of copying paper is fed further to the image transfer position via the paper feeding rollers 221 and 235, the second and subsequent sheets of copying paper go onto the separation lever 220. Then the paper feeding rollers 218 and 219 rotate in the reverse direction so that the second and the subsequent sheets of copying paper are carried back to the intermediate tray 243. The above operation is performed repeatedly until all sheets of copying paper on the intermediate tray 243 have been carried to the image transfer position.

Paper detection sensors are provided in the middle of the paper feeding path. These sensors are used not only to detect correct timing of operation of various parts but also to detect an error such as paper jamming. A first sensor 250 is located in front of the paper feeding rollers 235, a second sensor 251 in front of the registration rollers 238, a third sensor 252 in front of the paper feeding rollers 215, a fourth sensor 253 at a location between the paper ejecting rollers 216 and the paper ejecting outlet, a fifth sensor 254 immediately behind the paper feeding rollers 217, and a sixth sensor 255 in front of the separation lever 220.

Figure 3:
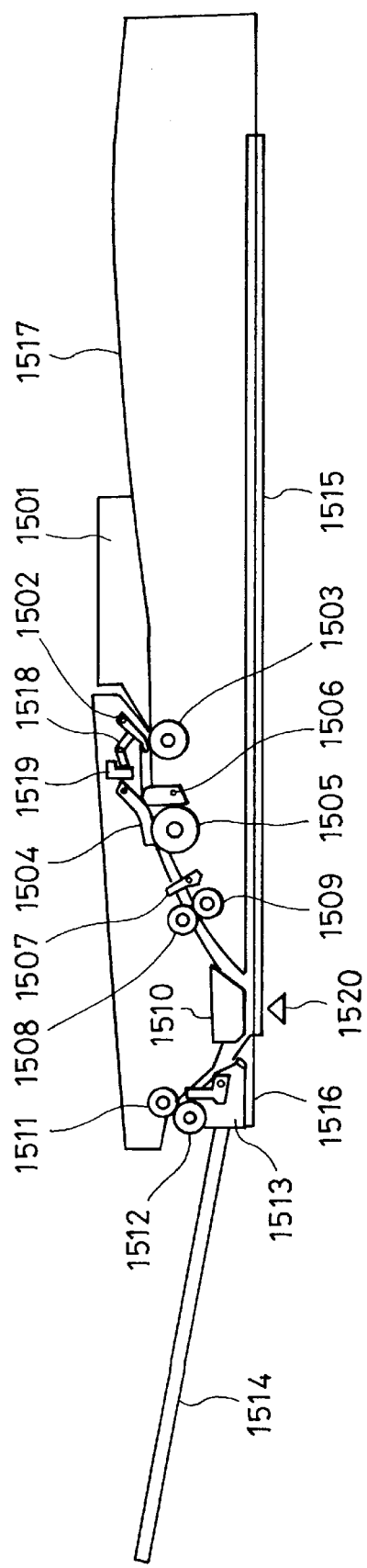
FIG. 3 is a schematic diagram illustrating the construction of an ADF.

FIG. 3 is a cross-sectional view of an automatic document feeder (hereafter referred to as an ADF) according to the present invention.

The ADF is removably mounted on the main body of the copier of FIG. 1 in such a manner that it can be opened and closed over the document plate like a lid. FIG. 3 illustrates the ADF in a closed state in which the ADF is operable. The ADF is provided with a document glass plate 1515 (corresponding to the document plate 200 shown in FIG. 1). There is also provided a stopper plate 1516 on the main body of the device. The ADF is electrically connected to the main body via a cable (not shown) so that the ADF can cooperate with the main body.

A side guide member 1501 defines the position of documents in the direction perpendicular to the motion of document or in the direction perpendicular to the page of the figure. An operation puts documents with the surface down on a document tray 1517. The side guide member 1501 is set to a right position and then a copy start key 305 is pressed. Thus, a document feed signal is transmitted from the main body to the ADF. In response to the signal, the ADF starts to feed documents.

In the feeding operation, a lever 1518 pushes a roller presser 1502 downward and lifts a stopper 1519 to an upper position so that a feeding roller 1503 may feed documents. A separation roller 1505 cooperates with a roller presser 1504 to separate the documents fed by the feeding roller 1503 one from another. A pair of registration rollers 1508 and 1509 transfers a document received from the separation roller 1505 to a location between a document presser 1510 and the document glass plate 1515. The document presser 1510 is formed into a shape which can direct the document received from the pair of registration rollers 1508 and 1509 onto the document glass plate. The document presser 1510 is properly pressed by a spring (not shown) against the document glass plate 1515 so that the document may come into good contact with the document glass plate.

At this stage, the first movable unit 203 in the main part of the digital copy machine is at rest below the position at which the document comes into contact with the document glass plate 1515. The document fed by the ADF is thus scanned and the image of the document is converted into an electric signal by a CCD line sensor 208. A pair of feed-out rollers 1511 and 1512 carries the document onto a fed-out document tray 1514.

Lever switches 1506, 1507, and 1513 monitor the passing of the document during the document feeding operation and determine whether an error such as paper jamming occurs on the basis of the timing of the on/off operation.

Figure 4:
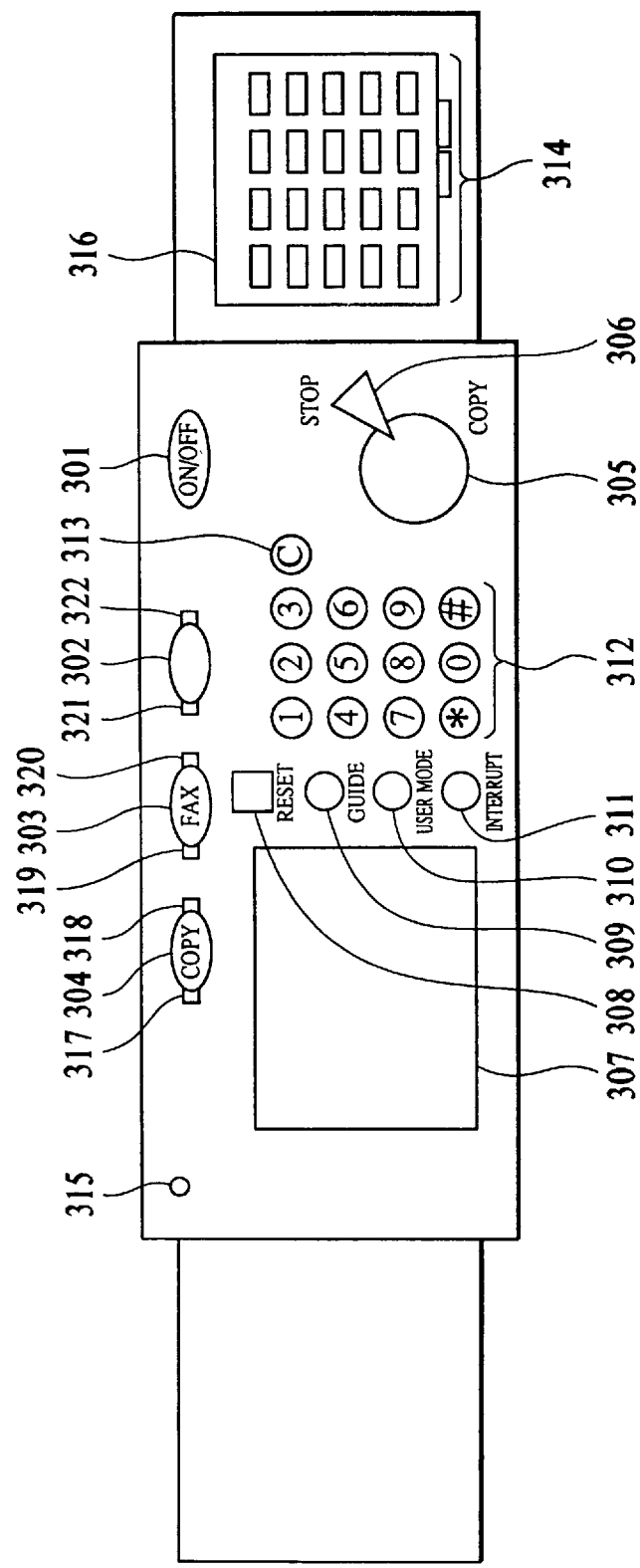
FIG. 4 is a schematic diagram illustrating the outward appearance of a control panel.

Referring now to FIG. 4, keys of the control panel of the digital copy machine will be described in detail below.

A main power lamp 315 turns on when the electric power is turned on. A power switch (not shown) is disposed on a side of the main body so that the power supply to the main body is controlled by the switch. A preheat key 301 is used to control the ON/OFF operation of the preheat mode (sleep mode).

A copy mode key 304 is used to select a copy mode of a plurality of functions. A facsimile mode key 303 is used to select a facsimile mode from the plurality of functions. An optional mode key 302 is used to select an optional mode such as a printer mode, if such an optional function is available, from the plurality of functions. Furthermore, there are provided status indication lamps 317–322 wherein the lamps 317 and 318 are used to indicate that the apparatus is in copying operation, the lamps 319 and 320 are used to indicate that the apparatus is in facsimile operation. Similarly, the lamp 321 and 322 are used to indicate that the apparatus is in optional operation. The lamps 317, 319, and 321 indicate that the apparatus is in normal operation while the lamps 318, 320 and 322 indicate occurrence of an error. The lamp 317 blinks when the apparatus is in copying operation while it is continuously lighted when the image memory is in use. The lamp 319 blinks when the apparatus is in facsimile transmission/reception operation while it is continuously lighted when the image memory is in use. The lamp 321 blinks when data is being received while it is continuously lighted when data is being transmitted. On the other hand, in the respective modes, the blinking lamps 318, 320, and 322 indicate paper jamming, lack of paper, and lack of toner while the continuous lighting of these lamps indicate occurrence of an error.

A copy start key 305 is used to start a copying operation and a stop key 306 is used to suspend or interrupt a copying operation. A reset key 308 is used as a key to reset a standby mode to a normal mode. A guide key 309 is provided for a user to acquire information about various functions. An interrupt key 311 is used to interrupt a copying operation to perform another copying operation. A ten-key pad 312 is used to input numerical data. A clear key 313 is used to clear numerical data. A user mode key 310 is provided for a user to change the fundamental setting of the system.

Furthermore, there are provided twenty one-stroke dialing keys 314 used to perform a dialing operation with one stroke in facsimile transmission. Two hinged cover plates 316 each have twenty openings corresponding to the one-stroke dialing keys 314. The state of the cover plates 316 is detected by a sensor switch (not shown). The possible states of the cover plates 316 include a first state in which both cover plates 316 are closed, a second state in which only the first cover plate is open, and a third state in which both cover plates are open. Each one-stroke dialing key 314 is assigned three different functions depending on which state of the above-described three states the cover plates 316 are in. As a result, the one-stroke dialing keys 314 in conjunction with the cover plates 316 are equivalent to separate keys as many as 20×3=60.

The control panel 307 also has a touch panel including a liquid crystal screen and a touch sensor. An image of set of control keys defined separately for each operation mode is displayed on the liquid crystal screen. A User can set the details of operation conditions by touching a key (keys) displayed on the screen.

Referring now to the block diagram shown in FIG. 5, the signal processing performed in the digital copy machine will be described below.

A CCD line sensor 401 (corresponding to the CCD line sensor 208 shown in FIG. 1) includes about 5,000 photosensor elements arranged in a line and outputs an electric signal line by line wherein each line of electric signal includes two image signals: an image signal associated with odd pixels and an image signal associated with even pixels. The output of the CCD line sensor 401 is applied to an analog-to-digital converter 402. The analog-to-digital converter 402 converts the analog signal received from the CCD line sensor 401 into a digital signal.

Figure 6:
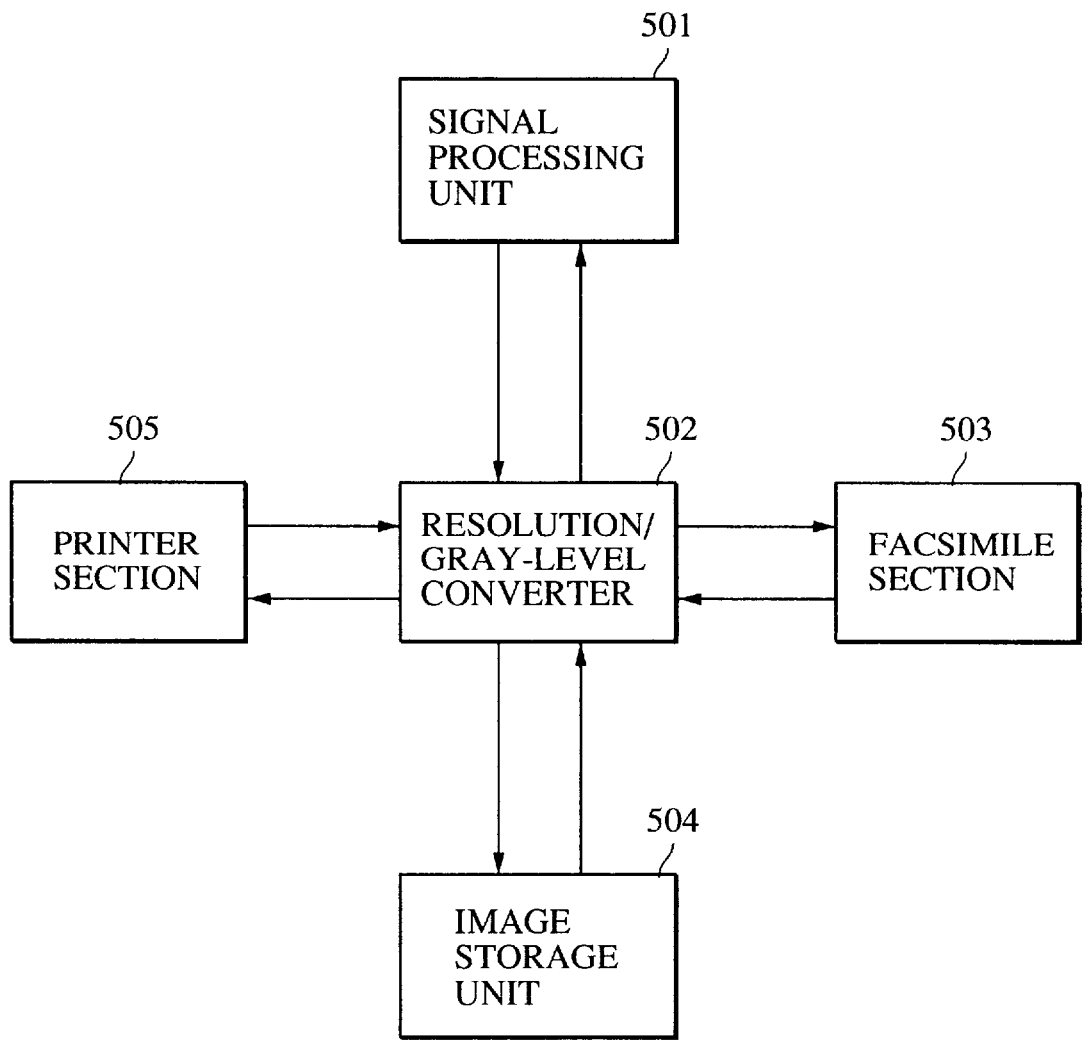
FIG. 6 is a block diagram illustrating the configuration of a system according to the present invention.

FIG. 6 shows the details of the analog-to-digital converter section 402. An analog processing circuit 901 inputs the two image signals associated with odd and even pixels output by the CCD line sensor and performs processing including clamping, gain adjustment, and sample-and-hold on each image signal. The above processed two image signals are combined into one signal by means of a switching operation, and the resultant signal is output by the analog processing circuit 901. An analog-to-digital converter 902 inputs the output signal of the analog processing circuit 901 and converts it into an 8-bit digital signal on the basis of the reference voltages supplied from the analog switch 903.

An AE circuit 904 controls the reference voltages applied to the analog-to-digital converter 902 so that the signal corresponding to the background area of a document output by the analog-to-digital converter becomes as close to a white level (FFhex) as possible. In response to the control signal from the CPU 423, the analog switch 903 selects either the reference voltage from the analog processing circuit 901 or the reference voltage from the AE circuit 904, and outputs the selected voltage to the analog-to-digital converter 902.

Furthermore, there is provided a driving signal generator (not shown) which supplies a synchronizing signal generated for each line and a driving clock signal to the CCD line sensor, the analog processing circuit 901, and the analog-to-digital converter 902.

Figure 7:
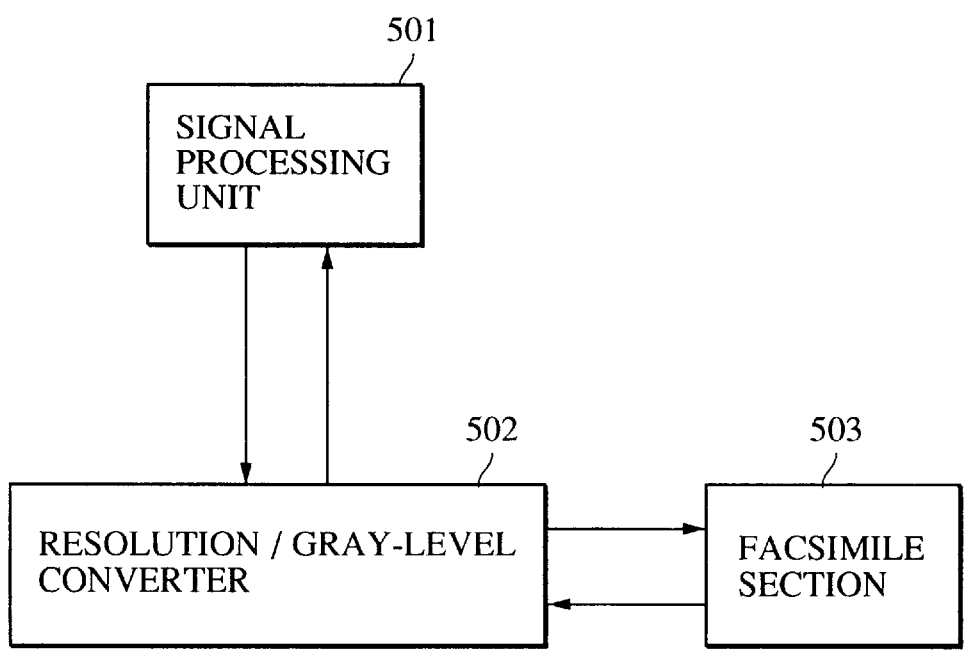
FIG. 7 is a block diagram illustrating the configuration of a system.

The AE circuit 904 controls the reference voltage of the analog-to-digital converter 902 depending on the output of analog-to-digital converter 902. That is, if the output of the analog-to-digital converter 902 is equal to FFhex, the AE circuit 904 increases, as shown in FIG. 7(2), the reference voltage according to a first time constant determined by the first resistor and the first capacitor (not shown) connected to the AE circuit 904. On the other hand, if the output of the analog-to-digital converter 902 is not equal to FFhex, the AE circuit 904 decreases, as shown in FIG. 7(1), the reference voltage according to a second time constant determined by a second resistor and a second capacitor (not shown) connected to the AE circuit. To prevent an abrupt change in the reference voltage in response to the change in the image signal, the above time constants are set to values corresponding to the order of a few ten lines.

Figure 5A:
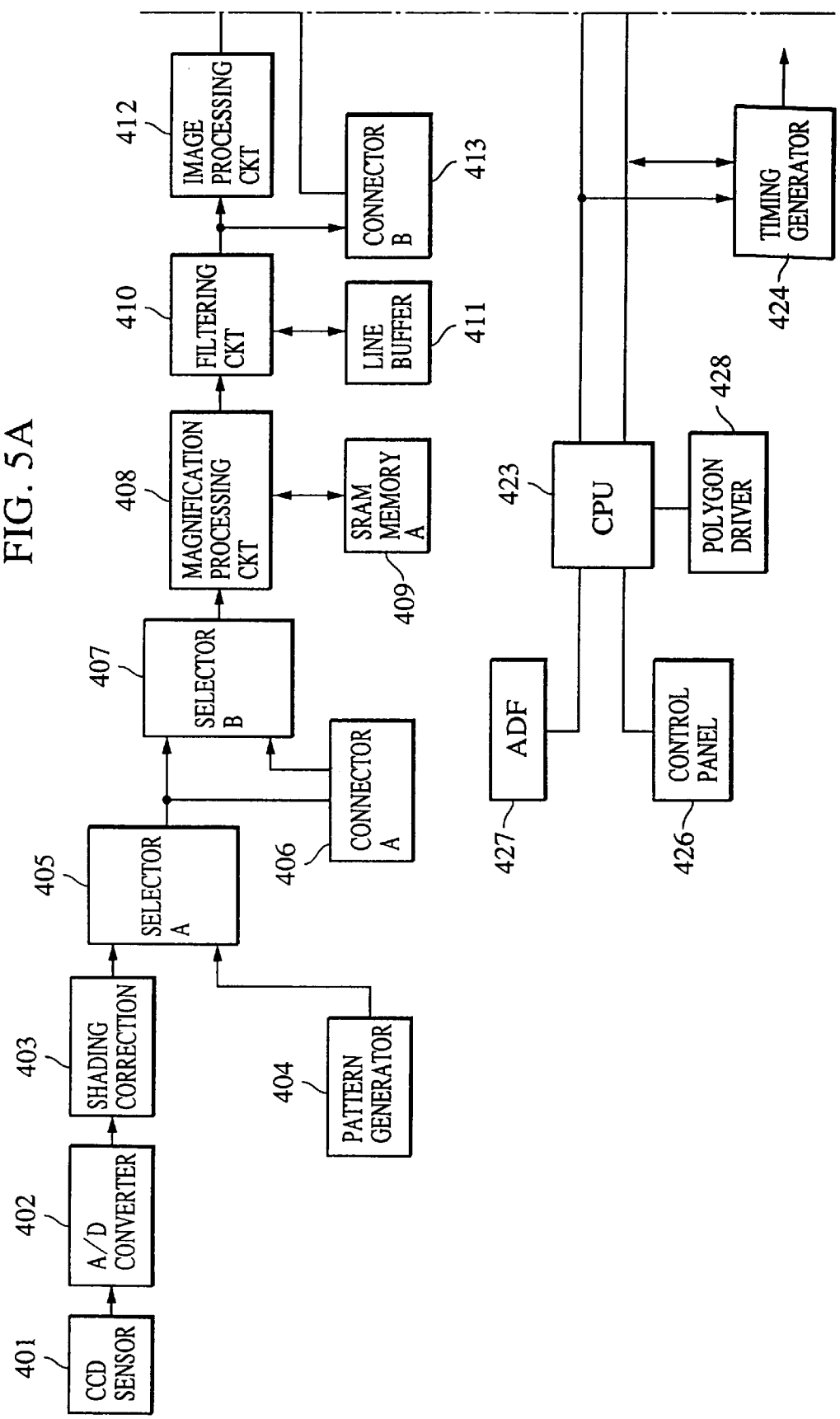
FIG. 5, comprised of FIGS. 5A and 5B, is a block diagram of a signal processing unit.

In FIG. 5, shading correction circuit 403 receives a digital signal converted from an analog signal into a digital form, and digitally corrects a variation in output value among the pixels of the sensor and among the optical systems in terms of the black level and the gain.

A pattern generator 404 generates various image patterns used to check the functions of the scanner section and the following circuits. The image patterns include a vertical ruled line, a horizontal ruled line, a checkered pattern, and gray scales. A selector A (405) selects either the output signal of the shading correction circuit 403 or that of the pattern generator 404 according to the control signal of CPU 423, and provides the selected output signal.

A connector A (406) includes terminals associated with the image input signal, the image output signal, pixel clock signal, image enable signal, and the synchronizing signal. The terminal associated with the image output signal of the connector A (406) is connected to the output of selector A (405) so that an additional signal processing circuit may be connected to the apparatus via the connector A (406) to extend the functions. A selector B (407) selects either the output signal of the selector A (405) or the output signal of the connector A (406) according to the control signal of CPU 423, and outputs the selected signal.

A magnification processing circuit 408 deals with a reduction in the number of pixels along the main scanning direction, linear interpolation, a reduction in the number of pixels along the secondary scanning direction, conversion of the typeface into a slant type, generation of a mirror image, repeating process, and folding process.

The magnification in the main scanning direction is accomplished by inputting the signal provided by the selector B (407) and calculating the pixel value from the values of two adjacent pixels by means of the linear interpolation. If the magnification factor in the main scanning direction is smaller than 50%, pre-processing is performed so that the number of pixels in the main scanning direction is reduced thereby preventing moire or a break in the magnified image. In the pre-processing, the reduction of pixels is performed by employing the maximum value or the averaged value of the neighboring n pixels (n=2, 4, 8) as a new pixel value. The CPU 423 determines the specific value for n and also determines whether the maximum value or the averaged value should be employed.

The magnification in the secondary scanning direction is accomplished by changing the scanning speed of the optical system including the exposure lamp and mirrors. In the case where the automatic document feeder is used, the magnification in the secondary scanning direction may be accomplished by changing the document feeding speed over the document plate 200. When a very small magnification factor is desired which cannot be dealt with by the change in the scanning speed of the optical system or the document feeding speed, the magnification processing circuit 408 reduces the number of pixels in the secondary scanning direction by means of electrical processing. The process of reducing the number of pixels in the secondary scanning direction is accomplished with a line buffer consisting of an SRAM A (409) in such a manner that a new pixel value is generated by employing the maximum value or the averaged value of n pixels (n=2, 4, 8) neighboring in the direction perpendicular to the lines. The CPU 423 determines the specific value for n and also determines whether the maximum value or the averaged value should be employed. The conversion of the typeface into a slant type, the generation of a mirror image, the repeating process, and the folding process are accomplished by properly controlling the operation of reading data from the line buffer consisting of the SRAM A (409).

A histogram is produced from the output signal of the selector B (407) using the SRAM A (409) of the magnification processing circuit 408. In the process of producing the histogram, the sampling interval and the sampling range are controlled by the timing signal generated by the timing signal generator 424 which is controlled by the CPU 423. The resultant histogram data is used to produce a brightness/gray-level table which is in a pre-scanning operation in the AE mode.

The output signal of the magnification processing circuit is applied to the filtering circuit 410 including a line buffer 411. The filtering circuit 410 filters the received signal with a 5×5 mask.

The output signal of the filtering circuit 410 is then applied to an image processing circuit 412, which performs masking or reversing process on the received signal. A connector B (413) includes the terminals for dealing with the image input signal, the image output signal, the pixel clock signal, the image enable signal, and the synchronizing signal. The output of the filtering circuit 410 is connected to the terminal for dealing with the image output signal of the connector B (413) so that an additional signal processing circuit may be connected to the apparatus via the connector B (413) so as to extend the functions.

A selector C 414 selects either the output signal of the image processing circuit 412 or the output signal of the connector B (413) according to the control signal of CPU 423, and outputs the selected signal.

The connector C 415 includes terminals associated with the image input signal, the image output signal, the pixel clock signal, the image enable signal, the synchronizing signal, the address bus, the data bus, and the interrupt signal. The output of the selector C 414 is connected to the terminal associated with the image output signal so that an additional system is connected to the apparatus via the connector C 415 so as to extend the functions.

One input A of a mixer 416 is connected to the output of the selector C 414, and the other input B is connected to the output of the connector C 415. The mixer 416 combines the input signals applied to the input terminals A and B, and outputs a resultant signal. The mixer can combine the input signals in various modes. The combining modes include: (1) superimposing; (2) multiple superimposing; (3) mesh covering; (4) transparent superimposing; (5) simply passing the input A; and (6) simply passing the input B. The combining mode is selected in response to the control signal generated by the CPU 423.

The output signal of the mixer 416 is applied to a table conversion processing circuit 417. The table conversion processing circuit 417 performs table conversion on the input signal on the basis of the data supplied from an SRAM B (418), and outputs a resultant signal.

The output signal of the table conversion processing circuit 417 is applied to a binary data generator 419. In response to the control signal generated by the CPU 423, the binary data generator 419 either converts the received signal into a binary form according to a predetermined binarization scheme or directly passes the received signal without performing any process.

In the binarization process of the present embodiment, each pixel is divided into two sub-pixels along the main scanning direction and each two sub-pixel is represented by a binary value thereby improving the resolution in the main scanning direction. The output signal of the binary data generator 419 is applied to a buffer 420, which adjusts the difference in the processing speed between the circuit sections preceding and following the buffer 420, and also adjusts the difference in the timing of starting the reading of an image signal.

The digital signal output from the buffer 420 is supplied to a PWM circuit 421, which in turn performs pulse-width modulation on the received digital signal and outputs a resultant signal. The PWM circuit 421 has three different modulation modes. The CPU 423 selects a proper modulation mode depending on the operation mode of the system.

In response to the output of the PWM circuit 421, a laser unit 422 controls the on/off operation of a laser.

Before starting a scanning operation, the CPU 423 sets the operation conditions of a timing generator 424 and a control signal generator 425. The timing generator 424 generates a timing signal and supplies it to various parts of the system. The control signal generator 425 serves as an expansion port of the CPU 423, and generates a control signal which is supplied to various parts of the system. The CPU 423 is connected to each connector via a system address bus and a system data bus whereby the CPU 423 controls the systems connected to the respective connectors.

The CPU 423 is also connected to the control panel 426 described above with reference to FIG. 3 so that the operations associated with the key input and the display of the control panel 426 are controlled by the CPU 423. Furthermore, the CPU 423 controls the polygon driver 428 to drive a polygon mirror, and also controls the operation of the ADF 427 shown in FIG. 3. FIGS. 6 and 7 illustrate some examples of system configuration, which will be described in detail below with reference to these figures.

In the example shown in FIG. 6, the system has additional capabilities of facsimile, printer, and electronic sorter as well as the basic capability of copying. In FIG. 7, the system has an additional capability of facsimile.

In FIGS. 6 and 7, the signal processing unit 501 is responsible for the operation associated with basic capability of copying described above with reference to FIG. 5. The facsimile section 503, the printer section 505, and the image storage unit 504 provide the capabilities of facsimile, printer, and electronic sorter, respectively. The image storage unit 504 has an external connector through which an additional device can be connected to the system thereby achieving an additional capability such as an external scanner or electronic filing.

A resolution/number-of-gray-levels converter 502 deals with the conversion of the resolution and the number of gray levels so as to avoid problems which would otherwise occur due to the difference in image resolution and/or the number of gray levels among various functions (capabilities). This ensures that a high quality image is obtained regardless of such a difference. Thus, the resolution/number-of-gray-levels converter 502 connected to the signal processing unit 501 makes it possible to expand the system capabilities as required. The connection between the signal processing unit 501 and the resolution/number-of-gray-levels converter 502 is accomplished via the connector C 415 shown in FIG. 5.

The connectors via which the resolution/number-of-gray-levels converter 502 is connected to the signal processing unit 501, the facsimile section 503, the image storage unit 504, and the printer section 505 each include terminals associated with the system address bus, the system data bus, the synchronizing signal, the pixel clock signal, and the interrupt signal.

Here, the system address bus and data bus refer to the buses connected to the CPU 423 shown in FIG. 5. The synchronizing signal is generated by the timing generator 424. The pixel clock signal is generated by an oscillator (not shown) in the signal processing unit. An interrupt signal is generated by the facsimile section 503, the image storage unit 504, or the printer section 505 to issue a request for processing to the CPU 423 shown in FIG. 5 or notify the CPU 423 of completion of processing or occurrence of an error.

Figure 8:
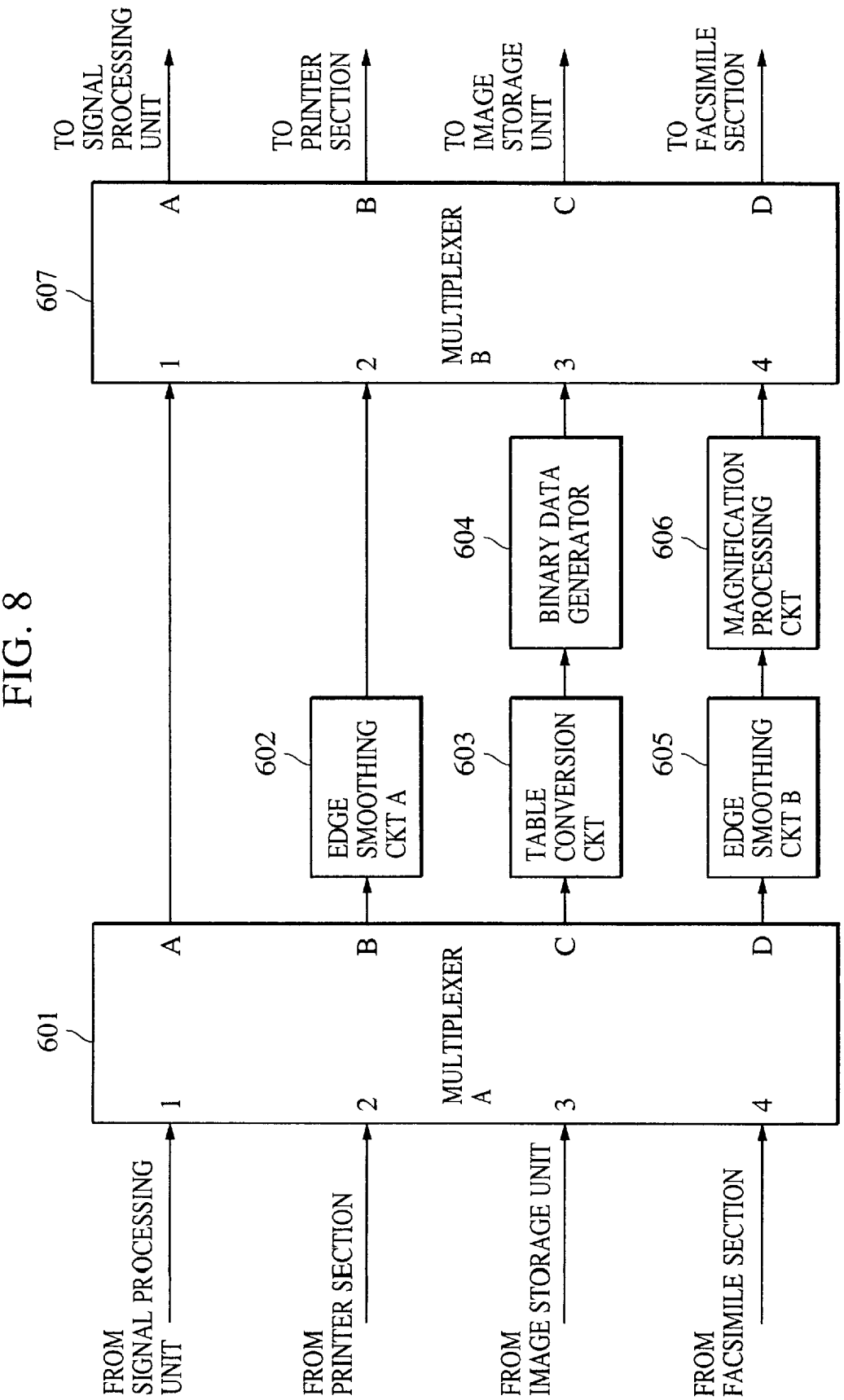
FIG. 8 is a block diagram of a resolution/number-of-gray-levels converter.

FIG. 8 is a block diagram illustrating the internal structure of the resolution/number-of-gray-levels converter 502. A multiplexer A (601) receives output signals generated by the signal processing unit 501, the facsimile section 503, the printer section 505, and the image storage unit 504, and distributes the received signals over first, second, third, and fourth signal paths. The first signal path is a through-path used to directly transfer the received signal without performing any processing. The second path receives a binary image signal and processes it to smooth the edge of a curved line. In this second path, an edge smoothing circuit A (602) receives a binary image signal from the multiplexer A (601), and assigns one bit to each of four sub-pixels obtained by dividing a pixel in the main scanning direction. Thus, each pixel signal is converted into a 4-bit signal.

The third signal path is used to convert a multilevel signal into a binary signal. In this third signal path, a table conversion processing circuit 603 receives a multilevel signal from the multiplexer A (601) and performs table conversion on it. The output signal of the table conversion processing circuit 603 is applied to a binary data generator 604 and subjected to binarization processing based on the gray level averaging method. In this process, each pixel is divided into two sub-pixels in the main scanning direction, and each sub-pixel is assigned one bit. Thus, each pixel signal is converted into a 2-bit signal.

The fourth signal path receives a binary image signal having various resolution and processes it in such a manner as to smooth the edge of a curved line. The resultant signal is output in the form of an 8-bit multilevel signal. In this fourth signal path, an edge smoothing circuit B (605) receives a binary signal from the multiplexer A (601) and processes it in such a manner as to smooth the edge of a curved line. The edge smoothing circuit B (605) outputs a resultant signal in the form of an 8-bit multilevel signal. The multilevel output signal of the edge smoothing circuit 605 is applied to a magnification processing circuit 606, which performs linear interpolation on the received signal and outputs a result in the form of an 8-bit multilevel signal.

A multiplexer B 607 receives a signal via the first, second, third, or fourth signal path, and distributes the received signal to the processing unit 501, the facsimile section 503, the printer section 505, and the image storage unit 504.

In facsimile transmission operation, an image signal is sent from the signal processing unit 501 to the facsimile section 503 via the resolution/number-of-gray-levels converter 502. In this case, the CPU controls the operation of the multiplexers A and B as follows. That is, the multiplexer A (601) shown in FIG. 8 selects a path from 1 to C so that the image signal is passed through the third signal path. On the other hand, the multiplexer B (607) selects a path from 3 to D.

In facsimile receiving operation, an image signal is sent from the facsimile section 503 to the signal processing unit 501 via the resolution/number-of-gray-levels converter 502. In this case, the multiplexers A and B are controlled by the CPU as follows. That is, the multiplexer A (601) shown in FIG. 8 selects a path from 4 to D so that the image signal is passed through the fourth signal path. On the other hand, the multiplexer B (607) selects a path from 4 to A.

In printing operation, an image signal is sent from the printer section 505 to the signal processing unit 501 via the resolution/number-of-gray-levels converter 502. In this case, the CPU controls the operation of the multiplexers A and B as follows. That is, the multiplexer A (601) shown in FIG. 8 selects a path from 2 to B so that the image signal is passed through the second signal path, while the multiplexer B (607) selects a path from 2 to A.

In the case where an original image is printed on paper having a standard paper size different from the original size, an image signal is sent from the printer section 505 to the signal processing unit 501 via the resolution/number-of-gray-levels converter 502. In this case, the CPU controls the operation of the multiplexers A and B in such a manner that the multiplexer A (601) shown in FIG. 8 selects a path from 2 to D so that the image signal is passed through the fourth signal path, while multiplexer B (607) selects a path from 4 to A.

When the electronic sorter function is utilized, an image signal is sent from the signal processing unit 501 to the image storage unit 504 via the resolution/number-of-gray-levels converter 502. In this case, the CPU controls the operation of the multiplexers A and B in such a manner that the multiplexer A (601) shown in FIG. 8 selects a path from 1 to A so that the image signal is passed through the first signal path, while the multiplexer B (607) selects a path from 1 to C.

In the case where an printing operation is performed after sorting the image data in the reverse order, an image signal is sent once from the printer section 505 to the image storage unit 504 via the resolution/number-of-gray-levels converter 502. In this case, the CPU controls the operation of the multiplexers A and B in such a manner that the multiplexer A (601) shown in FIG. 8 selects a path from 1 to A so that the image signal is passed through the first signal path, while the multiplexer B (607) selects a path from 1 to C. The image storage unit 504 writes image data onto a hard disk (not Shown) and then reads the image data from the hard disk in the reverse order. The image signal which has been read from the hard disk in image storage Unit 504 is sent to the signal processing unit 501 via the resolution/number-of-gray-levels converter 502. In this case, the CPU controls the operation of the multiplexers A and B in such a manner that the multiplexer A (601) shown in FIG. 8 selects a path from 3 to B so that the image signal is passed through the first signal path, while the multiplexer B (607) selects a path from 2 to A.

Figure 9:
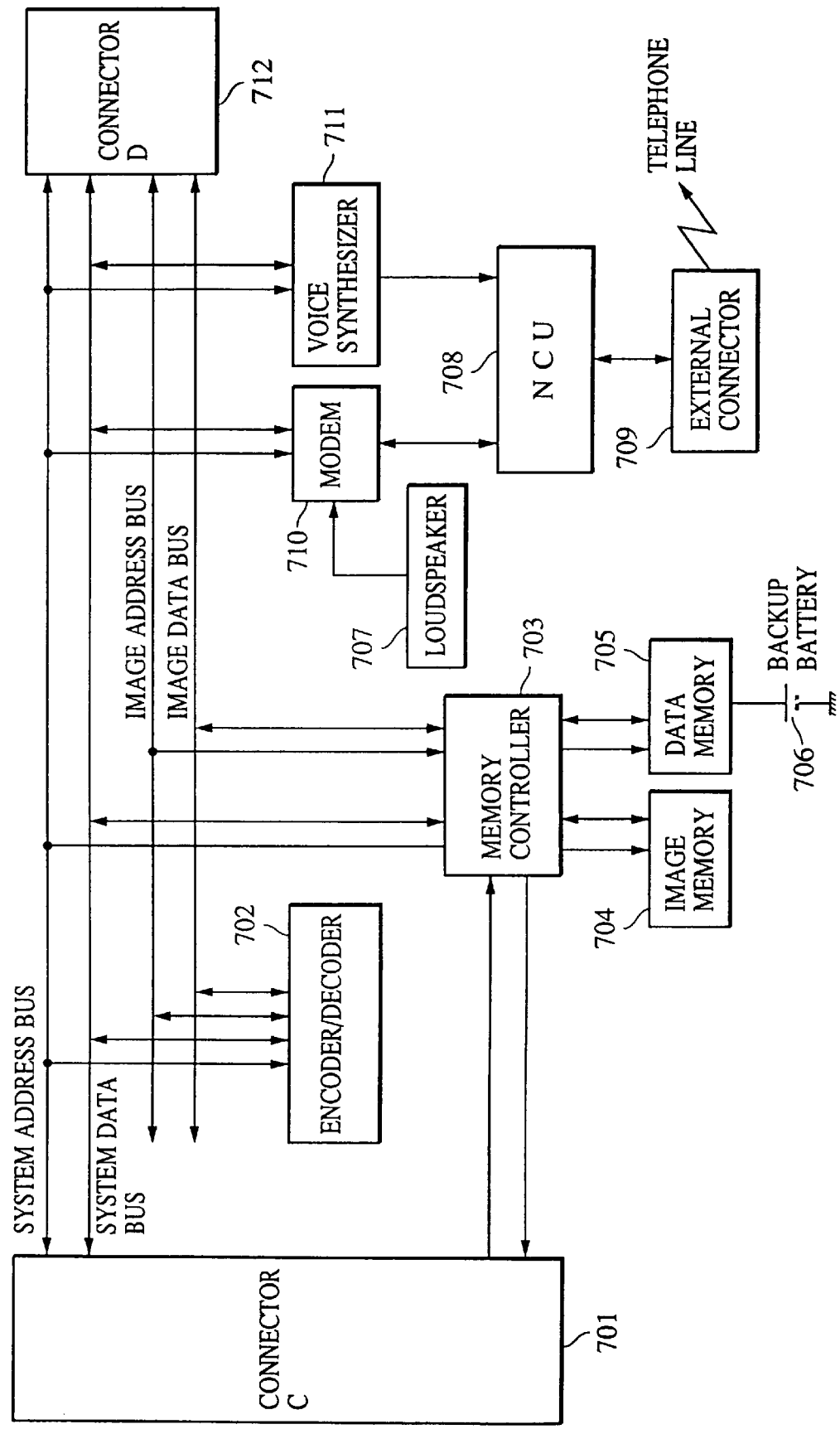
FIG. 9 is a block diagram of a facsimile section.

FIG. 9 is a block diagram illustrating the facsimile section 503, which will be described in detail below with reference to the figure.

The connector C (701) includes terminals associated with the system address bus, the system data bus, the video input signal, the synchronizing signal, the pixel clock signal, and the interrupt signal. Via this connector C (701), the resolution/number-of-gray-levels converter 502 is connected to the facsimile section 503.

In a facsimile transmission operation, a memory controller 703 receives a video input signal via the connector C (701) and stores the image data in an image memory 704.

An encoder/decoder 702 is connected to the memory controller 703 via an image address bus and an image data bus. The encoder/decoder 702 includes a DMA controller. The encoder/decoder 702 communicates with the memory controller 703 so as to receive image data from the image memory 704 by means of high-speed DMA transmission. The encoder/decoder 702 encodes the received image data, and transmits the encoded data to an encoded data memory 705 by means of DMA transmission thereby storing the encoded data therein. To protect the data stored in the encoded data memory 705 from power supply malfunctions such as interruption of service, the encoded data memory 705 is connected to a backup power supply (battery) 706.

The encoder/decoder 702, the memory controller 703, the modem 710, and the voice synthesizer 711 are connected to the CPU via the system address bus and the system data bus and further via the connector C (701) so that the CPU can control these circuit elements.

When the encoder/decoder 702 has completed the encoding operation on the image data stored in the image memory 704, the encoder/decoder 702 transmits an interrupt signal to the CPU thereby notifying the CPU of the completion of the encoding operation. On reception of the interrupt signal, the CPU reads encoded data from the encoded data memory 705 via the memory controller 703, and writes it as the transmission data into the modem 710. The modem 710 modulates the transmission data into an analog signal. The resultant signal is transmitted via an NCU (network control unit) 708 and further via an external connector 709. The modem is also connected to a loudspeaker 707 whereby the communication via the modem may be monitored by means of a voice signal.

In the facsimile receiving operation, if the modem 710 receives an analog signal via the external connector 709 and further via the NCU 708, the modem 710 generates an interrupt signal to the CPU thereby notifying the CPU of the arrival of data. On reception of the interrupt signal, the CPU reads the data from the modem 710 and writes the data in the form of codes into the encoded data memory 705 via the memory controller 703. After completion of writing the data into the encoded data memory 705, the CPU transmits a signal to the encoder/decoder 702 via the system bus thereby notifying it of the completion of the writing operation. The encoder/decoder 702 communicates with the memory controller 703 so as to receive the data from the encoded data memory 705 by means of high-speed DMA transmission. The encoder/decoder 702 decodes the encoded data received from the encoded data memory 705, and transmits the decoded image data to the image memory 704 by means of DMA transmission thereby storing the image data therein. When the encoder/decoder 702 has completed the decoding operation on the encoded data stored in the encoded data memory 705, the encoder/decoder 702 transmits an interrupt signal to the CPU thereby notifying the CPU of the completion of the decoding operation.

In response to the timing signal supplied via the connector C (701), the memory controller 703 outputs a video signal from the image memory 704 to the connector C (701). The memory controller 703 has the capability of rotating the image stored in the image memory 704 by 90°, 180°, or 270° using a buffer provided in the memory controller 703. This makes it possible to output image data after rotating the received data or the data to be transmitted as required.

When some communication call has arrived, the voice synthesizer 711 synthesizes a voice message on the basis of the data which has been given via the system bus, and transmits the synthesized message via the NCU 708.

The facsimile section is also provided with a connector D (712) connected to the system buses and the image buses so that an additional device may be connected to the facsimile section via the connector D (712) so as to expand the capabilities.

Figure 10:
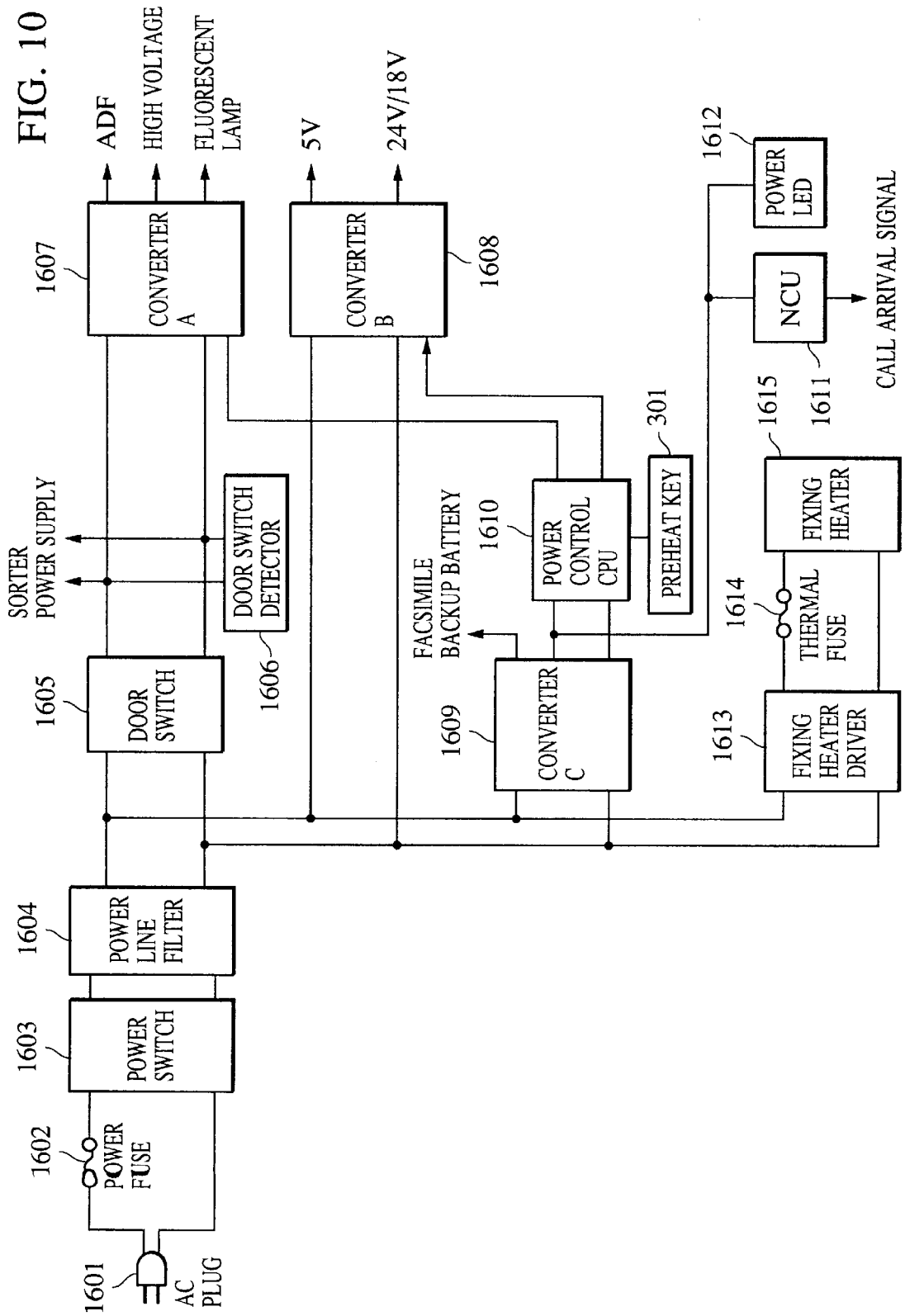
FIG. 10 is a schematic diagram illustrating the construction of a power supply system according to a first embodiment.

Referring now to FIG. 10, a power supply system according to an embodiment of the present invention will be described in detail below.

In FIG. 10, 100-V AC power is supplied via an AC plug 1601 to the power supply system of the invention. A power fuse 1602 is provided so as protect the system from an excess current due to a failure. A power switch 1603 is disposed on a side of the case of the image formation apparatus. This power switch 1603 is usually kept in an on-state so that the system may receive a facsimile call. A power line filter 1604 removes noise from the AC power line.

A converter A (1607) converts the AC power into various forms of power supplies. They include a power supply to the automatic document feeder (ADF), a high voltage power supply for a charger, and a power supply for a fluorescent lamp in the scanner section. A door switch 1605 is in an off-state if the front door of the image formation apparatus is closed, thereby controlling the supply of the AC power to the converter A (1607). The door switch 1605 operates in response to the opening and closing of the front door of the image formation apparatus thereby turning off the high voltage dangerous to an operator when the door is open. The door switch detector 1606 detects the voltage on the power line, and notifies the CPU 1610 whether the door switch 1605 is in an on-state or off-state.

The converter B (1608) converts the AC power so as to provide a 5-V power supply and also a 24 V/18 V power supply whose voltage is selectable between 24 V and 18 V. The 5-V power supply is connected to the signal processing circuit, the CPUs, peripheral circuits, and sensors in various sections. The 24 V/18 V power supply is connected to a cooling fan, motors for driving paper feeding rollers and a flapper, a photoconductive drum driving motor, a scanner driving motor, a polygon motor for scanning a laser beam, and a motor for driving a copied paper counter. In the case where an automatic document feeder is installed on the image formation apparatus or a copying paper tray is installed at a lower position in the image formation apparatus, the 24 V/18 V power supply is also connected to parts associated with these devices. The automatic document feeder needs electric power with a voltage at least equal to or higher than 18 V. That is, in the automatic document feeder, electric power is supplied from the 24 V/18 V power supply to devices such as a motor and a sensor to detect whether a document is present in place. The copying paper tray installed at a lower part in the main body of the apparatus also needs electric power with a voltage at least equal to or higher than 18, and electric power is supplied from the 24 V/18 V power supply to devices such as a motor and a sensor to detect whether the copying paper tray which can be opened and shut like a drawer is at a shut position.

A converter C (1609) always supplies electric power as long as the power switch 1603 is in an on-state. Of the power supply lines provided by the converter C (1609), one line is used to charge a backup battery to protect facsimile codeddata from troubles of the power supply such as interruption of service. The other line is connected to a power control CPU 1610, the NCU 1611 of the facsimile section, and a power supply indication LED 1612. Thus, when the power switch 1603 is in the on-state, the NCU 1611 of the facsimile section always monitors the telephone line. If the NCU 1611 detects an arrival of a call, it transmits a call arrival indication signal to the power control CPU 1610. The power control CPU 1610 includes a memory which stores a program for controlling the operation in the manner described later with reference to the flow chart. The power control CPU 1610 monitors the facsimile arrival indication signal and the status of the preheat key 301, and generates a control signal according to a predetermined algorithm to Converters A and B (1607, 1608) thereby controlling these converters. If the 5-V power supply connected to the converter B (1608) is in an on-state and thus CPU 423 is in operation, the power control CPU 1610 communicates with the CPU 423 so as to transmit information to each other. The contents of the information transmitted from the power control CPU include the states of the switches and signals monitored by the power control CPU 1610, and the operation modes of the converters A and B (1607, 1608). The CPU 423 transmits the information about the operation mode of the system.

Under the control of the CPU 423, a fixing heater driver 1613 supplies electric power to a fixing heater 1615. If the fixing heater 1615 becomes uncontrollable due to some failure in the system, a thermal fuse 1614 detects an abnormally high temperature and shuts off the power supply to the fixing heater 1615.

Figure 11:
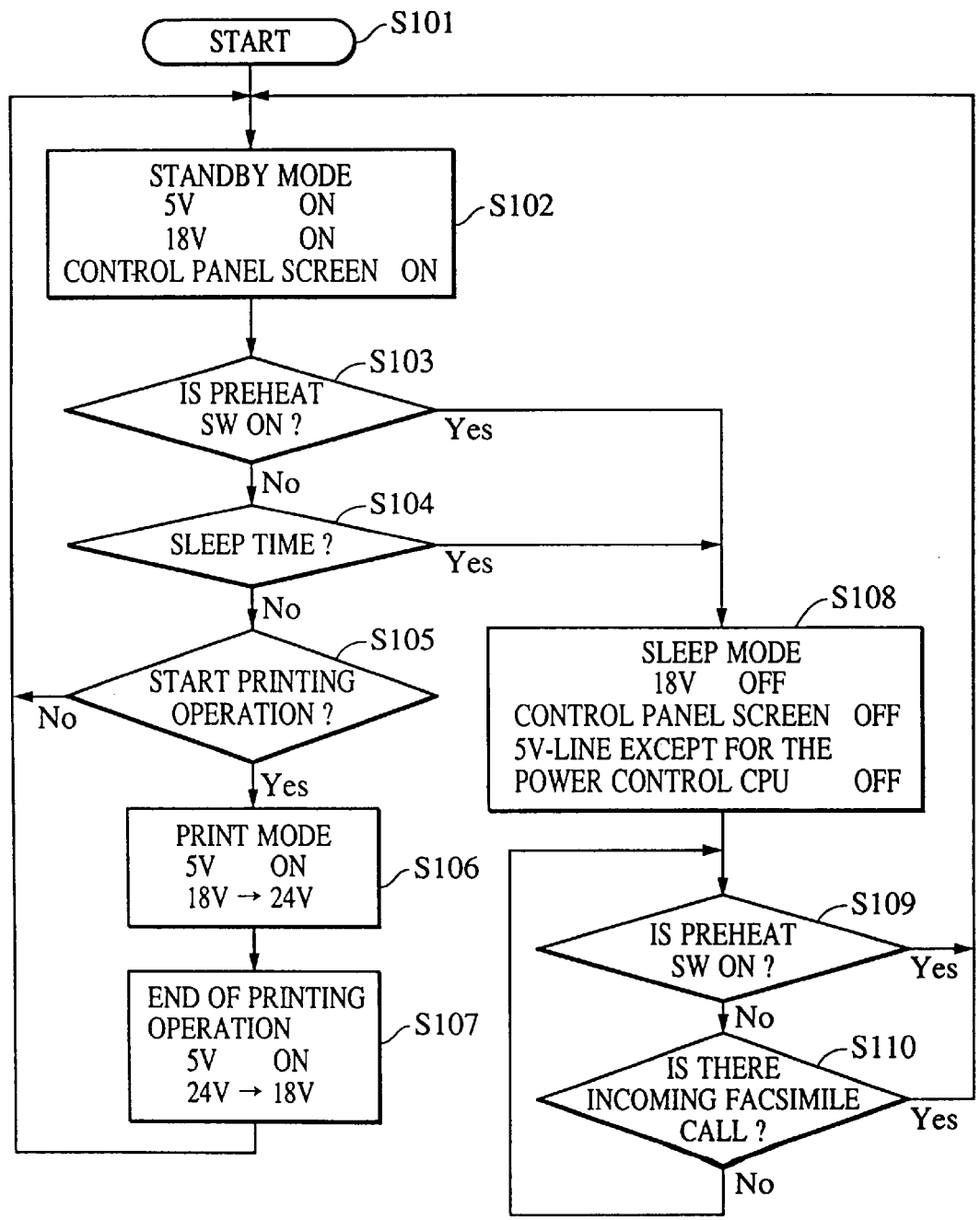
FIG. 11 is a flowchart illustrating the operation according to the first embodiment.

The operation of the first embodiment of the invention is now described below with reference to the flowchart shown in FIG. 11. If the power switch 1603 is turned on, the power control CPU 1610 starts its operation (S101), and the image formation apparatus goes into a standby mode. In the standby mode, the converter B (1608) supplies 5 V and 24 V/18 V electric power. At this stage, the output voltage of the 24 V/18 V power supply is set to 18 V so as to reduce the power consumption. Furthermore, an operation control screen is displayed on the liquid crystal touch panel 307 on the control panel.

In step S103, the power control CPU 1610 detects the state of the preheat switch 301. If the preheat switch 301 is in an on-state, the process goes to step S108 and enters a sleep mode. On the other hand, if the preheat switch 301 is in an off-state, the process goes to step S104, in which the power control CPU 1610 communicates with the CPU 423 to check whether the keys on the control panel or the touch panel has been operated for a time period longer than a predetermined value (sleep time). If the non-operation time period has reached the predetermined value, then the process goes to step S108 and enters a sleep mode. If the non-operation time period has not reached the predetermined value, then the power control CPU 1610 communicates with the CPU 423 to check whether the image formation apparatus is going to start a printing operation (step S105). If no, the process returns to step S102 and repeats the program steps in the standby mode. If the image formation apparatus is going to start a printing operation, then the process goes to step S106 and enters a printing mode. The output voltage of the 24 V/18 V power supply is switched from 18 V to 24 V thereby making it possible to perform a printing operation. If the printing operation is completed (step S107), the output voltage of the 24 V/18 V power supply is returned to 18 V so as to reduce the power consumption. The process then returns to step S102 and enters the standby mode.

In the sleep mode (S108), the operation control screen of the touch panel 307 is turned off, and the 24 V/18 V power supply is turned off. Furthermore, the 5-V power supply provided by the converter B (1608) is turned off. However, the electric power to the power control CPU (1610) is still supplied by the converter C (1609) even in the sleep mode. In step S109, the power control CPU (1610) monitors the state of the preheat switch 301. If the preheat switch 301 is in an on-state, the process returns to step S102 and enters the standby mode again. If the preheat switch 301 is in an off-state, the process goes to step S110 at which the power control CPU (1610) monitors whether a facsimile call arrival indication signal is generated by the NCU of the facsimile section. If a facsimile call has arrived, the process goes to step S102 and enters the standby mode. After entering the standby mode, the 5-V power supply is turned on, and the CPU 423 starts to operate. Then the power control CPU (1610) communicates with the CPU 423 so as to notify it of the arrival of the facsimile call. If no facsimile call is detected in step S110, then the process returns to step S109 so as to enter a loop to monitor the preheat switch 301 and the arrival of a facsimile call.

Figure 12:
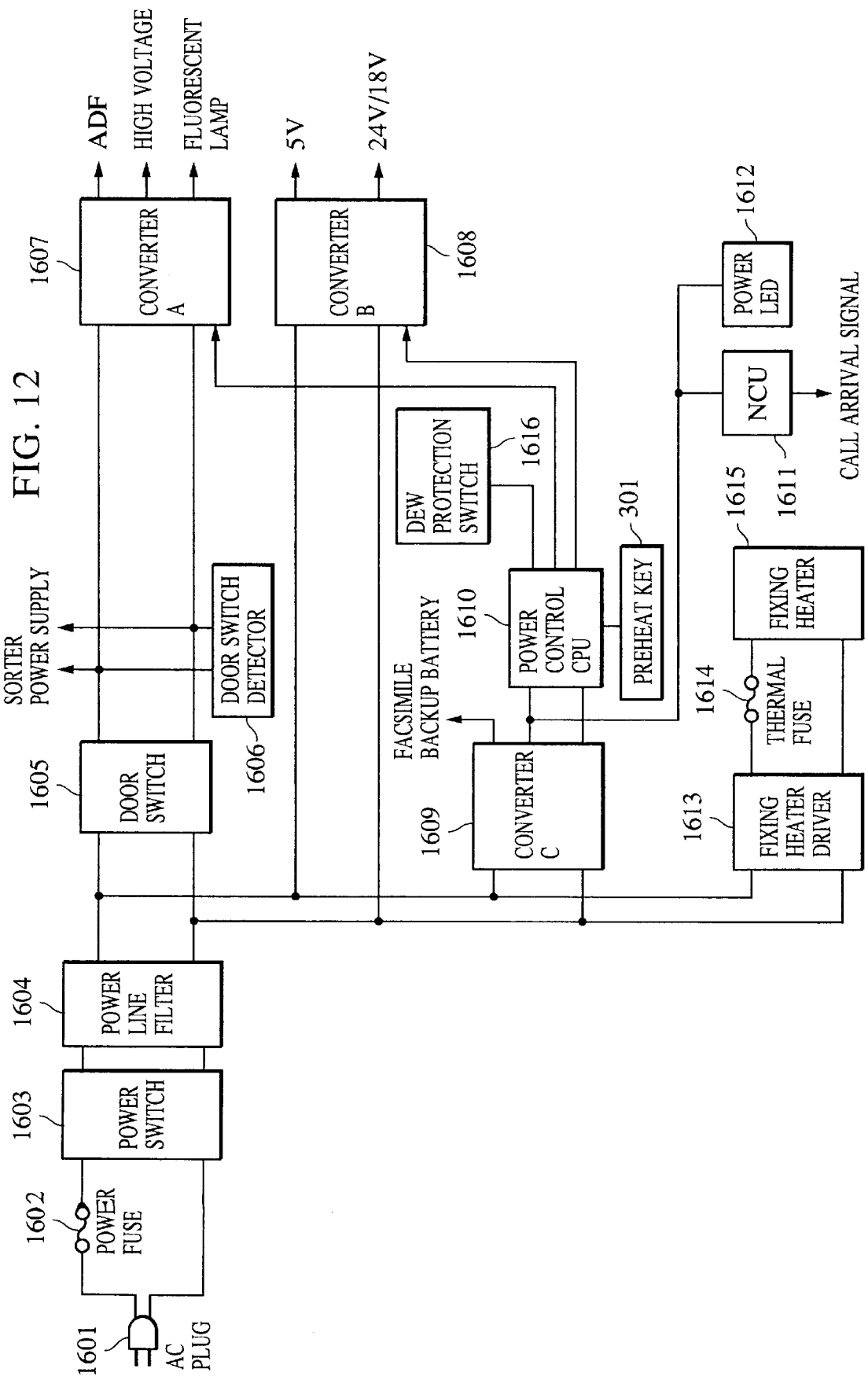
FIG. 12 is a schematic diagram illustrating the construction of a power supply system according to second and third embodiments.

FIG. 12 is a schematic diagram illustrating a power supply system according to a second embodiment of the invention. This power supply system is similar to that of the first embodiment shown in FIG. 10 except that there is provided a dew protection switch 1616. The dew protection switch 1616 is turned on when it is desirable to protect the inside of the apparatus from dew condensation caused by a temperature difference between the ambient atmosphere and the inside of the apparatus.

Figure 13:
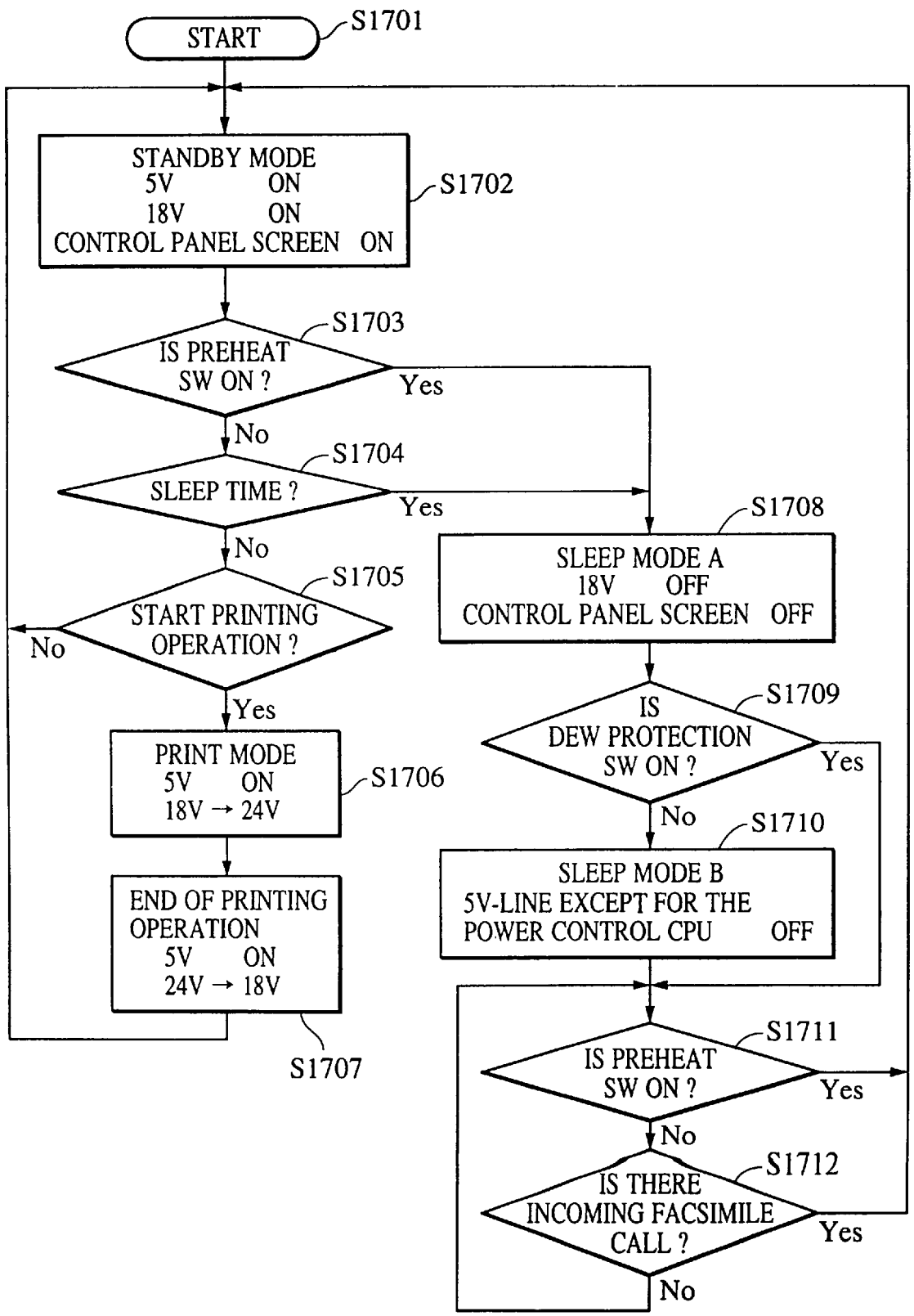
FIG. 13 is a flowchart illustrating the operation according to the second embodiment.

The operation of the second embodiment of the invention is described below with reference to the flowchart shown in FIG. 13.

If the power switch 1603 is turned on in step S1701, the power control CPU 1610 starts to operate in step S1701 and the image formation apparatus enters a standby mode in step S1702. In the standby mode, the converter B (1608) shown in FIG. 16 supplies 5 V and 24 V/18 V electric power. At this stage, the output voltage of the 24 V/18 V power supply is set to 18 V so as to reduce the power consumption. Furthermore, an operation control screen is displayed on the liquid crystal touch panel 307 on the control panel.

In step S1703, the power control CPU 1610 checks the state of the preheat switch 301. If the preheat switch 301 is in an on-state, the process goes to step S1708 and enters a sleep mode. On the other hand, if the preheat switch 301 is in an off-state, the process goes to step S1704, in which the power control CPU 1610 communicates with the CPU 423 to check whether the keys on the control panel or the touch panel has been operated for a time period longer than a predetermined value (sleep time). In the present embodiment, there are two sleep modes A and B. If the non-operation time period has reached the predetermined value, then the process goes to step S1708 and enters a sleep mode A. If the non-operation time period has not reached the predetermined value, then the power control CPU 1610 communicates with the CPU 423 to check whether the image formation apparatus is going to start a printing operation (step S1705). If no, the process returns to step S1702 and repeats the program steps in the standby mode. If the image formation apparatus is going to start a printing operation, then the process goes to step S1706 and enters a printing mode. The output voltage of the 24 V/18 V power supply is switched from 18 V to 24 V thereby making it possible to perform a printing operation. If the printing operation is completed (step S1707), the output voltage of the 24 V/18 V power supply is returned to 18 V so as to reduce the power consumption. The process then returns to step S1702 and enters the standby mode.

In the sleep mode A (S1708), the operation control screen is turned off. Furthermore, the 24 V/18 V power supply is also turned off. In step S1709, the power control CPU 1610 checks the state of the dew protection switch 1616 disposed on the inner wall of the front door of the main body of the image formation apparatus. If the dew protection switch 1616 is in an off-state, then the process enters a sleep mode B. In the sleep mode B, the 5-V power supply output from the converter B (1608) is turned off, and the process goes to step S1711. However, the electric power to the power control CPU (1610) is still supplied by the converter C (1609) even in the sleep mode B. On the other hand, if the dew protection switch 1616 is in an on-state in step S1709, then the process goes to step S1711 without entering the sleep mode B. In this case, the 5-V power supply from the converter B (1608) is maintained in the on-state, and thus circuits such as the signal processing circuit remain in the power-on state. As a result, heat is generated in the circuits and thus the temperature inside the apparatus increases. Thus, generation of dew is prevented.

In step S1711, the power control CPU 1610 monitors the state of the preheat switch 301. If the preheat switch 301 is in an on-state, the process returns to step S1702 and enters the standby mode again. If the preheat switch 301 is in an off-state, the process goes to step S1712 at which the power control CPU 1610 monitors whether a facsimile call arrival indication signal is generated by the NCU of the facsimile section. If a facsimile call has arrived, the process goes to step S1702 and enters the standby mode. After entering the standby mode, the 5-V power supply is turned on, and the CPU 423 starts to operate. Then the power control CPU (1610) communicates with the CPU 423 so as to notify it of the arrival of the facsimile call. If no facsimile call is detected in step S1712, then the process returns to step S1711 so as to enter a loop to monitor the preheat switch 301 and the arrival of a facsimile call.

A third embodiment of a power supply system according to the present invention will now be described below. In this third embodiment, the power supply system has the same circuit configuration as that employed in the second embodiment.

Figure 14:
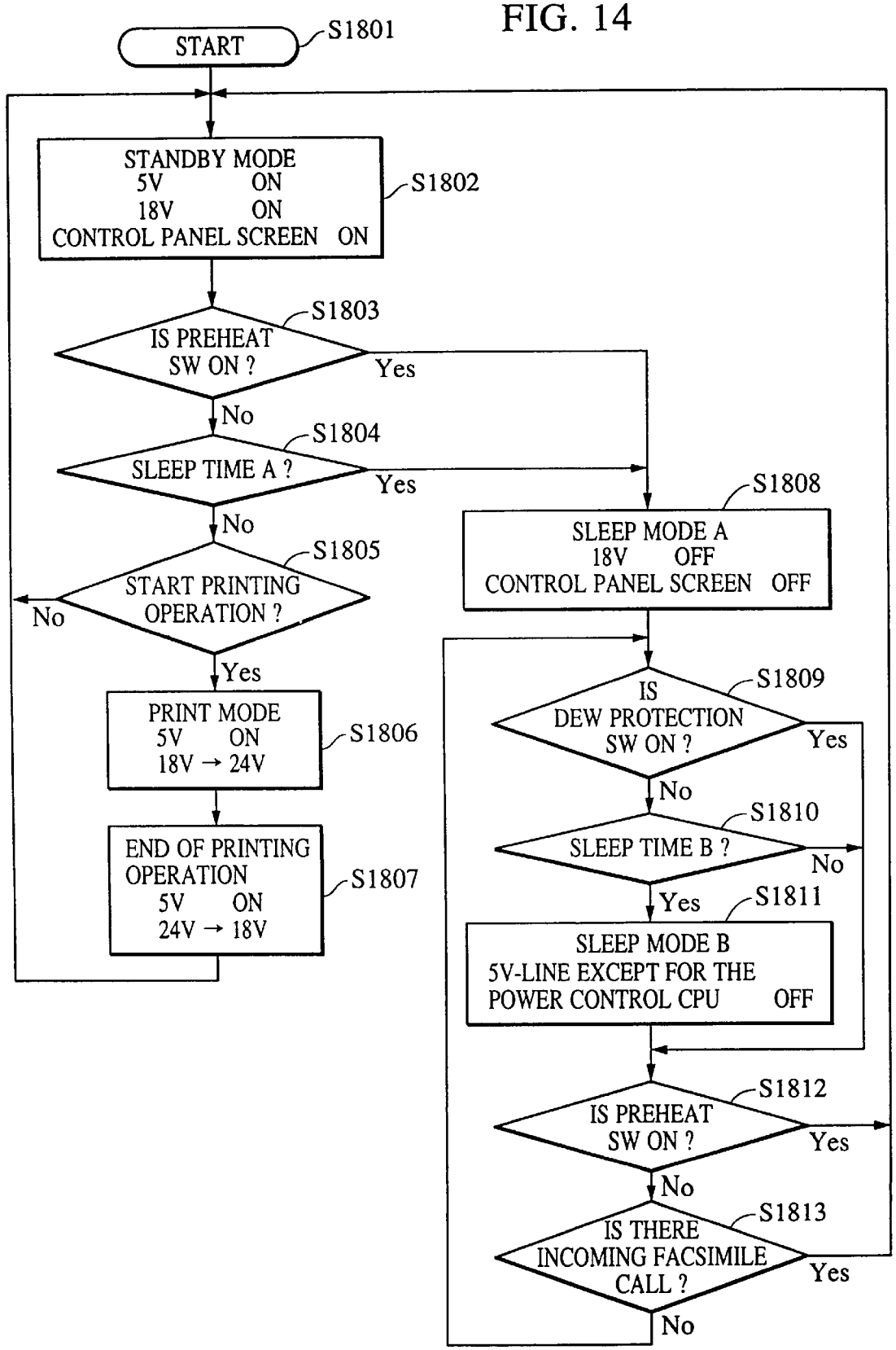
FIG. 14 is a flowchart illustrating the operation according to the third embodiment.

FIG. 14 is a flowchart illustrating the operation of the third embodiment of the invention, which will be described in detail below.

If the power switch 1603 is turned on, the power control CPU 1610 starts its operation (S1801) in a standby mode (S1801). In the standby mode, the converter B (1608) supplies 5V and 24 V/18 V electric power. At this stage, the output voltage of the 24 V/18 V power supply is set to 18 V so as to reduce the power consumption. Furthermore, an operation control screen is displayed on the liquid crystal touch panel 307 on the control panel.

In step S1803, the power control CPU 1610 checks the state of the preheat switch 301. If the preheat switch 301 is in an on-state, the process goes to step S1808 and enters a sleep mode. On the other hand, if the preheat switch 301 is in an off-state, the process goes to step S1804, in which the power control CPU 1610 communicates with the CPU 423 to check whether the keys on the control panel or the touch panel has been operated for a time period longer than a predetermined value (sleep time). In the present embodiment, there are two sleep modes A and B wherein each sleep mode has its own sleep time A or B. If the non-operation time period has reached the sleep time A, then the process goes to step S1808 and enters a sleep mode A. If the non-operation time period has not reached the sleep time A, then the power control CPU 1610 communicates with the CPU 423 to check whether the image formation apparatus is going to start a printing operation (step S1805). If no, the process returns to step S1802 and repeats the program steps in the standby mode. If the image formation apparatus is going to start a printing operation, then the process goes to step S1806 and enters a printing mode. The output voltage of the 24 V/18 V power supply is switched from 18 V to 24 V thereby making it possible to perform a printing operation. If the printing operation is completed (step S1807), the output voltage of the 24 V/18 V power supply is returned to 18 V so as to reduce the power consumption. The process then returns to step S1802 and enters the standby mode.

In the sleep mode A (S1808), the operation control screen is turned off. Furthermore, the 24 V/18 V power supply is also turned off. In step S1809, the power control CPU 1610 checks the state of the dew protection switch 1616 disposed on the inner wall of the front door of the main body of the image formation apparatus. If the dew protection switch 1616 is in an off-state, the process goes to step 1811 and the power control CPU 1610 checks whether the elapsed time after entering the sleep mode A has reached the predetermined value (sleep time B). If the elapsed time has reached the predetermined value, then the process goes to step S1811 and enters a sleep mode B. In the sleep mode B, the 5-V power supply output from the converter B (1608) is turned off, and the process goes to step S1812. However, the electric power to the power control CPU (1610) is still supplied by the converter C (1609) even in the sleep mode B. If the dew protection switch 1616 is in an on-state in step S1809, or if the elapsed time has not reached the sleep time B in step S1810, then the process goes to step S1812 without entering the sleep mode B.

In step S1812, the power control CPU (1610) monitors the state of the preheat switch 301. If the preheat switch 301 is in an on-state, the process returns to step S1802 and enters the standby mode again. If the preheat switch 301 is in an off-state, the process goes to step S1813 at which the power control CPU (1610) monitors whether a facsimile call arrival indication signal is generated by the NCU of the facsimile section. If a facsimile call has arrived, the process goes to step S1802 and enters the standby mode. After entering the standby mode, the 5-V power supply is turned on, and the CPU 423 starts to operate. Then the power control CPU (1610) communicates with the CPU 423 so as to notify it of the arrival of the facsimile call. If no facsimile call is detected in step S1813, then the process returns to step S1809 so as to check the state of the dew protection switch.

In the specific embodiments described above, the ADF is mounted on the document plate in such a manner that it can be opened and closed over the document plate wherein there is provided a sensor for detecting whether the ADF is in an open state or a closed state. Electric power may always be supplied to the above ADF sensor so that when the ADF sensor detects a change in the open/closed state of the ADF during the sleep mode the operation exits the sleep mode. Furthermore, although the 24 V/18 V power supply is employed for the ADF, an additional separate power supply may be provided so that electric power is always supplied to the ADF even in the sleep mode thereby making it possible to exit the sleep mode when a sensor detects that a document is placed on the ADF.

Electric power may always be supplied to the printer section so that the sleep mode may be cancelled when some command is input to the printer section.

In the present invention, as described above, when the apparatus enters a low power consumption mode, some low-voltage power supply is maintained in an on-state thereby protecting the apparatus from dew condensation without having to provide an additional heater.

Furthermore, in the present invention, the image formation apparatus has two low power consumption modes. In a first low power consumption mode, the operation control screen is turned off. When a certain time period has elapsed after entering a first low power consumption mode, the operation enters a second low power consumption mode in which the main CPU for controlling the sequence of the operation of the image formation apparatus is turned off. This ensures that when the first low power consumption mode is cancelled, the image formation apparatus can immediately start its operation without having to perform an initial setting operation with the main CPU.

Although the invention has been described above with respect to its preferred forms, those with skill in the art will readily recognize that various modifications and changes may be made thereto without departing from the spirit and scope of the claims appended hereto.

What is claimed is:

1. A power supply controller for use in an electronic apparatus, said power supply controller comprising:

a first power supply for supplying electric power to a first circuit of said electronic apparatus;

a second power supply for supplying electric power to a second circuit different from said first circuit;

low power consumption mode switching means for switching said electronic apparatus to a low power consumption mode;

dew protection mode setting means for setting a dew condensation prevention mode to prevent dew condensation inside said electronic apparatus; and control means for, when said electronic apparatus is switched to use the lower power consumption mode, turning off the power supply to the first circuit by the first power supply and maintaining the power supply to the second circuit by the second power supply if the dew condensation prevention mode is set, and turning off the power supply to the first circuit by the first power supply and to the second circuit by the second power supply if the dew condensation prevention mode is not set.

2. A power supply controller according to claim 1, wherein the electric power supplied by said first power supply to said first circuit is larger than that supplied by said second power supply to said second circuit.

3. A power supply controller according to claim 1, wherein said first circuit is a driving circuit for driving a load of said electronic apparatus and said second circuit is a microcomputer for controlling operation of said electronic apparatus.

4. A power supply controller according to claim 1, wherein said low power consumption mode switching means switches said electronic apparatus to the low power consumption mode when said electronic apparatus has not been operated for a predetermined time period.

5. A power supply controller according to claim 1, wherein said low power consumption mode switching means switches said electronic apparatus to the low power consumption mode by an input using a predetermined key.

6. A power supply controller according to claim 1, wherein, when said dew protection mode is not set, said control means turns off the power supply by said second power supply when a predetermined time has elapsed after turning off said first power supply.

7. A power supply controller according to claim 6, wherein said control means turns off the electric supply by said second power supply if said electronic apparatus has not been operated for a predetermined time period after turning off the electric supply by said first power supply.

8. A power supply controller according to claim 1, wherein said electronic apparatus is an image formation apparatus using an electro-photographic process.

9. A power supply controller for use in an image formation apparatus, said power supply controller comprising:

a first control circuit for controlling the image formation apparatus to form an image;

a second control circuit for controlling electric power supplied to said image formation apparatus;

a first power supply for supplying electric power to said first control circuit;

a second power supply for supplying electric power to said second control circuit;

a third power supply for supplying electric power to a load in said image formation apparatus;

a dew protection switch operable in an on-state and an off-state, the on-state for setting an operation mode of said image formation apparatus to prevent dew condensation inside said image formation apparatus; and low power consumption mode setting means for setting a low power consumption mode of said image forming apparatus, wherein, when said low power consumption mode is set and said dew protection switch is in the on-state, said second control circuit turns off said third power supply and maintains operation of said first and second power supplies, and wherein, when said dew protection switch is in the off-state, said second control circuit turns off said first and third power supplies and maintains operation of said second power supply.

10. A power supply controller according to claim 9, wherein said second control circuit controls an on/off timing of said first and third power supplies so that said first power supply is turned off when a predetermined time period has elapsed after turning off said third power supply.

11. A power supply controller according to claim 10, wherein said second control circuit turns off said first power supply if said image formation apparatus has not been operated for a predetermined time period after said third power supply has been turned off.

12. A power supply controller according to claim 9, further comprising communication means for communicating with an external source, wherein, when the low power consumption mode is set and said communications means receives a communication from the external source, said second control circuit cancels the low power consumption mode.

13. A power supply control method for use in electronic apparatus, said method comprising the steps of:

supplying electric power to a first circuit of said electronic apparatus;

supplying electric power to a second circuit different from said first circuit;

controlling, when said electronic apparatus is switched to a low power consumption mode, to turn off the power supply to said first circuit and to maintain the power supply to said second circuit if a dew condensation prevention mode for preventing dew condensation inside said electronic apparatus is set; and controlling, when said electronic apparatus is switched to a low power consumption mode, to turn off the power supply to said first circuit and said second circuit if the dew condensation prevention mode is not set.

14. A method of controlling a power supply of an image formation apparatus which can operate in a low power consumption mode and a dew condensation prevention mode, said method comprising the steps of:

supplying electric power to a first control circuit for controlling image formation in the image formation apparatus;

supplying electric power to a second control circuit for controlling electric power supplied to said image formation apparatus; and supplying electric power to a load in said image formation apparatus;

wherein, when said image formation apparatus operates in both the low power consumption mode and the dew condensation prevention mode, said method stops supplying the electric power to the load in the image formation apparatus and continues to supply electric power to the first and second control circuits, and wherein, when said image formation apparatus does not operate in the dew condensation prevention mode, said method stops supplying electric power to the first control circuit and to the load and continues to supply electric power to the second control circuit.

15. A method according to claim 14, wherein, when said image formation apparatus does not operate in the dew condensation prevention mode, said method further comprises the step of stopping a supply of electric power to the first control circuit when a predetermined time period has elapsed after stopping a supply of electric power to the load.

16. A method according to claim 15, wherein, when said image formation apparatus does not operate in the dew condensation prevention mode, said method further comprises the step of stopping a supply of electric power to the first control circuit if said image formation apparatus has not been operated for a predetermined time period after stopping a supply of electric power to the load.

17. A method according to claim 14, further comprising the steps of:

communicating with an external source; and cancelling said low power consumption mode if a communication has been received from the external source when said image formation apparatus is in said low power consumption mode.

* * * * *

UNITED STATES PATENT AND TRADEMARK OFFICE
CERTIFICATE OF CORRECTION

PATENT NO. : 5,862,437
DATED : January 19, 1999
INVENTOR(S) : Satoru Kutsuwada, et al.

It is certified that error appears in the above-indentified patent and that said Letters Patent is hereby corrected as shown below:

COLUMN 1

Line 35, "require" should read --requires--.

COLUMN 2

Line 8, "system;" should read --system according to the present invention;-- and
Line 17, "embodiment." should read --embodiment;--.

COLUMN 6

Line 11, "lamp" should read --lamps--;
Line 25, "cate" should read --cates--;
Line 51, "307" should be deleted, and "touch panel" should read --touch panel 307--; and
Line 54, "User" should read --user--.

COLUMN 12

Line 10, "an" should read --a--;
Line 20, "Shown)" should read --shown)--;
Line 22, "Unit" should read --unit--; and
Line 53, "malfunctions" should read --malfunctions,--.

UNITED STATES PATENT AND TRADEMARK OFFICE
CERTIFICATE OF CORRECTION

PATENT NO. : 5,862,437
DATED : January 19, 1999
INVENTOR(S) : Satoru Kutsuwada, et al.

It is certified that error appears in the above-indentified patent and that said Letters Patent is hereby corrected as shown below:

COLUMN 14

Line 51, "Converters" should read --converters--.

COLUMN 20

Line 24, "communications" should read --communication--.

Signed and Sealed this

Twenty-eighth Day of September, 1999

Attest:

Q. TODD DICKINSON

Attesting Officer     Acting Commissioner of Patents and Trademarks